US012742621B2

(12) United States Patent
Gilbert et al.

(10) Patent No.: US 12,742,621 B2
(45) Date of Patent: Sep. 22, 2026

(54) NON-LETHAL MARKING COMPOSITION, PROJECTILE, AND CARTRIDGE

(71) Applicant: General Dynamics Ordnance and Tactical Systems—Canada, Inc., Repentigny (CA)

(72) Inventors: Charles-Olivier Gilbert, Repentigny (CA); Sophie Dufort, Repentigny (CA); Marc Palardy, Repentigny (CA); Isabelle Theobald, Repentigny (CA); Francois Rouillard, Repentigny (CA); Mathieu Desrosiers, Repentigny (CA)

(73) Assignee: General Dynamics Ordnance and Tactical Systems—Canada, Inc., Repentigny (CA)

( * ) Notice: Subject to any disclaimer, the term of this patent is extended or adjusted under 35 U.S.C. 154(b) by 0 days.

(21) Appl. No.: 18/971,662

(22) Filed: Dec. 6, 2024

(65) Prior Publication Data

US 2025/0189281 A1 Jun. 12, 2025

Related U.S. Application Data

(60) Provisional application No. 63/608,115, filed on Dec. 8, 2023.

(51) Int. Cl.
*F42B 12/40* (2006.01)
*C09D 5/22* (2006.01)
(Continued)

(52) U.S. Cl.
CPC ................ *F42B 12/40* (2013.01); *C09D 5/22* (2013.01); *C09D 7/43* (2018.01); *C09D 7/63* (2018.01); *C09D 171/02* (2013.01)

(58) Field of Classification Search
CPC ... F42B 12/40; F42B 8/02; C09D 7/20; C09D 7/43
See application file for complete search history.

(56) References Cited

U.S. PATENT DOCUMENTS 6,393,992 B1 * 5/2002 Vasel ...................... H02M 7/48 102/370
2007/0079722 A1 4/2007 Parish
(Continued)

FOREIGN PATENT DOCUMENTS

WO WO-2005040288 A2 * 5/2005 ............... C09D 5/22
WO WO-2013109634 A1 * 7/2013 ............. F42B 12/40

*Primary Examiner* — Jonathan C Weber
(74) *Attorney, Agent, or Firm* — Ingrassia Fisher & Lorenz, LLP

(57) ABSTRACT

A non-lethal marking projectile is disclosed. The marking projectile includes a frangible polymeric shell that has an interior cavity and is configured to engage rifling in a barrel so that the marking projectile spins when fired through the barrel. The marking projectile further includes a non-aqueous shear-thinning marking composition within the interior cavity of the polymeric shell. The marking composition comprises an organic solvent, a thickener, a surfactant, and an optional colorant. The marking composition is stable over time and across a wide range of operating conditions. A non-lethal firearm cartridge is also provided and comprises the marking projectile disposed in the mouth of a casing, and a propelling system adapted to expel the projectile from the casing and through a barrel when fired from a firearm.

20 Claims, 3 Drawing Sheets

(51) Int. Cl.

| | |
|---|---|
| ***C09D 7/43*** | (2018.01) |
| ***C09D 7/63*** | (2018.01) |
| ***C09D 171/02*** | (2006.01) |

(56) References Cited

U.S. PATENT DOCUMENTS

2010/0083862 A1* 4/2010 Ciesiun .................. F42B 12/78
156/146
2014/0318402 A1 10/2014 Carlson et al.
2014/0373745 A1 12/2014 Carlson et al.

* cited by examiner 2
4
6

2
4
6
10
8
12

2
4
6

2
4
6
10
8
14
16
12

2
25
20
26
34
30
24
42
36
40
32
28
38

NON-LETHAL MARKING COMPOSITION, PROJECTILE, AND CARTRIDGE

CROSS REFERENCE TO RELATED APPLICATION

This application claims the benefit of U.S. Provisional Application No. 63/608,115, filed on Dec. 8, 2023. The entire disclosure of the above application is incorporated herein by reference.

TECHNICAL FIELD

The present disclosure relates generally to non-lethal marking projectiles and cartridges for firearms and, more specifically, to projectiles utilizing a shear-thinning or pseudoplastic marking composition with improved stability and post-storage accuracy, precision, and marking performance.

BACKGROUND

Recently, the use of non-lethal projectiles for training and recreational purposes in place of conventional bullets has increased. The non-lethal projectiles are often constructed of low-weight, frangible materials that fracture upon impact with the target lessening the momentum transferred by the impact, thereby reducing the likelihood of injury or terminal damage. The projectiles often comprise a polymer material instead of the heavier metal or metal composites used in conventional bullets to reduce the overall weight of the projectile and correspondingly the momentum transferred from the projectile to the target upon impact. The lower weight also allows the projectile to be fired with a reduced propellant charge, or even no propellant but instead the use of a primer as an energetic material, and travel at a lower speed to further reduce the likelihood of damage to the target. In many applications, a marking fluid or other payload is placed in a space within the projectile such that the marking fluid is dispensed from the projectile upon impact to mark the impact site.

The marking fluid can generally improve the ballistic characteristics of the projectile by filling the hollow interior of the projectile with a liquid medium that increases the overall weight of the projectile. The dissipation of the liquid medium upon impact also provides the dual benefit of reducing the force of the impact. However, if the marking fluid solidifies as a result of excessively high or low temperatures or other storage conditions, the solid projectile can prevent or hinder the fracturing of the projectile thereby reducing the amount of impact energy dissipated by the deformation of the projectile. The solid marking media also impacts with more force than marking fluids as the solid media will not dissipate as readily as marking fluid.

As typical applications require the marking fluid to be non-toxic and easily removable from clothing, such as camouflaged clothing, protective lenses, etc., aqueous marking fluids are commonly used to improve the washability of the marking fluid, which is ideally cleaned without the use of heated water or detergents as these may not be readily available. Unfortunately, however, certain marking fluids containing water can be prone to premature aging as moisture evaporates via migration through projectile body housing the fluid. This may lead to reduced viscosity and mass of the marking fluid, and thus a diminished marking effect on the intended target after time, depending on the storage and use conditions. In some cases, after storage in unfavorable conditions, aqueous-composition-based projectiles may even occasionally fail to mark, especially at very cold temperatures. As the marking fluid ages, it may also be subject to a phase change and its mass distribution within the projectile may itself cease being uniform. This is known to produce a range of differing projectile moments of inertia for a given population of projectiles that were produced at the same time. Such variations in the projectile moment of inertia are undesirable for exterior ballistic consistency and accuracy on the target. Unfortunately, however, non-lethal marking ammunition is often used by the military and defense organizations in places where ideal storage conditions are not available, such that the likelihood of the storage conditions having a negative effect on the marking fluid and ultimately the ballistic performance of the projectile is high.

For example, it is known that certain storage conditions cause marking fluids to separate into solid and liquid phases (e.g. when cold); or otherwise cause the marking fluid to dry out (e.g. when hot). The uneven weight of the different phases or a dried out marking fluid can cause unpredictable or poor ballistic characteristics, in addition to the other issues mentioned above. Other concepts for making fluids have been employed using wax or oil-based color marking compounds. However, such compounds are not suitable for use on force training because the wax or oil-based color marking compound is difficult to clean up after training as it does not fully wash off simply with a damp cloth. As such, these wax or oil-based compounds induce additional logistical burdens, including having to machine wash training and protective gear after an exercise.

Accordingly, it is desirable to provide nonlethal cartridges including nonlethal projectiles for firearms that address one or more of the foregoing concerns. Furthermore, other desirable features and characteristics of the various embodiments described herein will become apparent from the subsequent detailed description and the appended claims, taken in conjunction with the accompanying drawings and this background.

SUMMARY

A marking projectile is provided. The marking projectile includes a frangible polymeric shell, which comprises a cylindrical portion and has an interior cavity, and is configured to engage rifling in a barrel so that the marking projectile spins when fired through the barrel. The marking projectile further includes a marking composition within the interior cavity of the shell. The marking composition is a non-aqueous shear-thinning fluid and comprising an organic solvent, a thickener, a surfactant, and optionally a colorant.

A non-lethal firearm cartridge is also provided. The cartridge comprises the marking projectile disposed in the mouth of a casing, and an energetic material (e.g. a propellant or propelling system) adapted to expel the projectile from the casing and through a barrel when fired from a firearm.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The various embodiments will hereinafter be described in conjunction with the following drawing figures, wherein like numerals denote like elements, and wherein:

FIG. 7 is a plot of rheometric data (viscosity) obtained in the Examples.

FIG. 8 is a plot of temperature-dependent accuracy performance of marking projectiles prepared in the Examples.

DETAILED DESCRIPTION

Figures 1, 2:
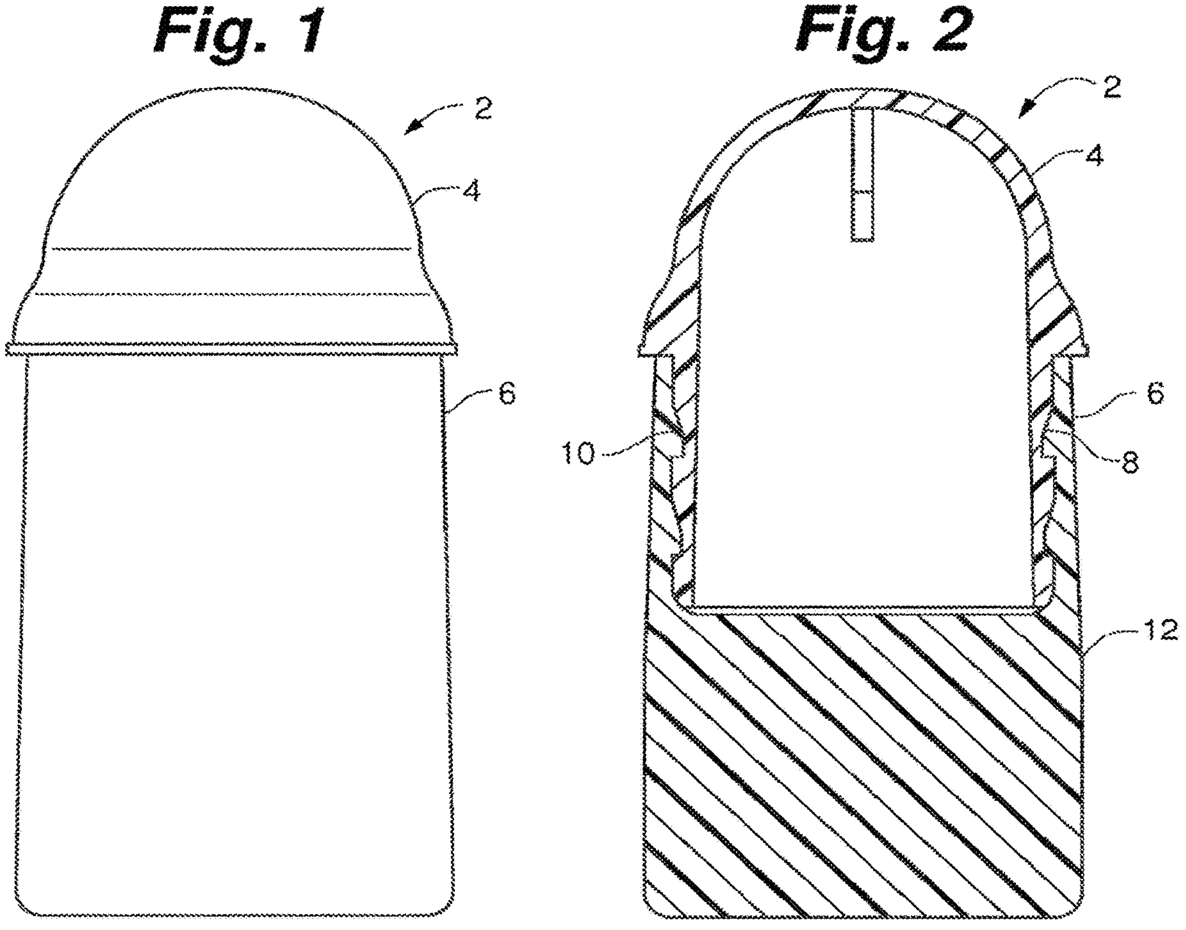
FIG. 1 is a side view of a non-lethal projectile band according to an embodiment of the present invention.
FIG. 2 is a cross-sectional side view of the non-lethal projectile depicted in FIG. 1.
Figures 3, 4:
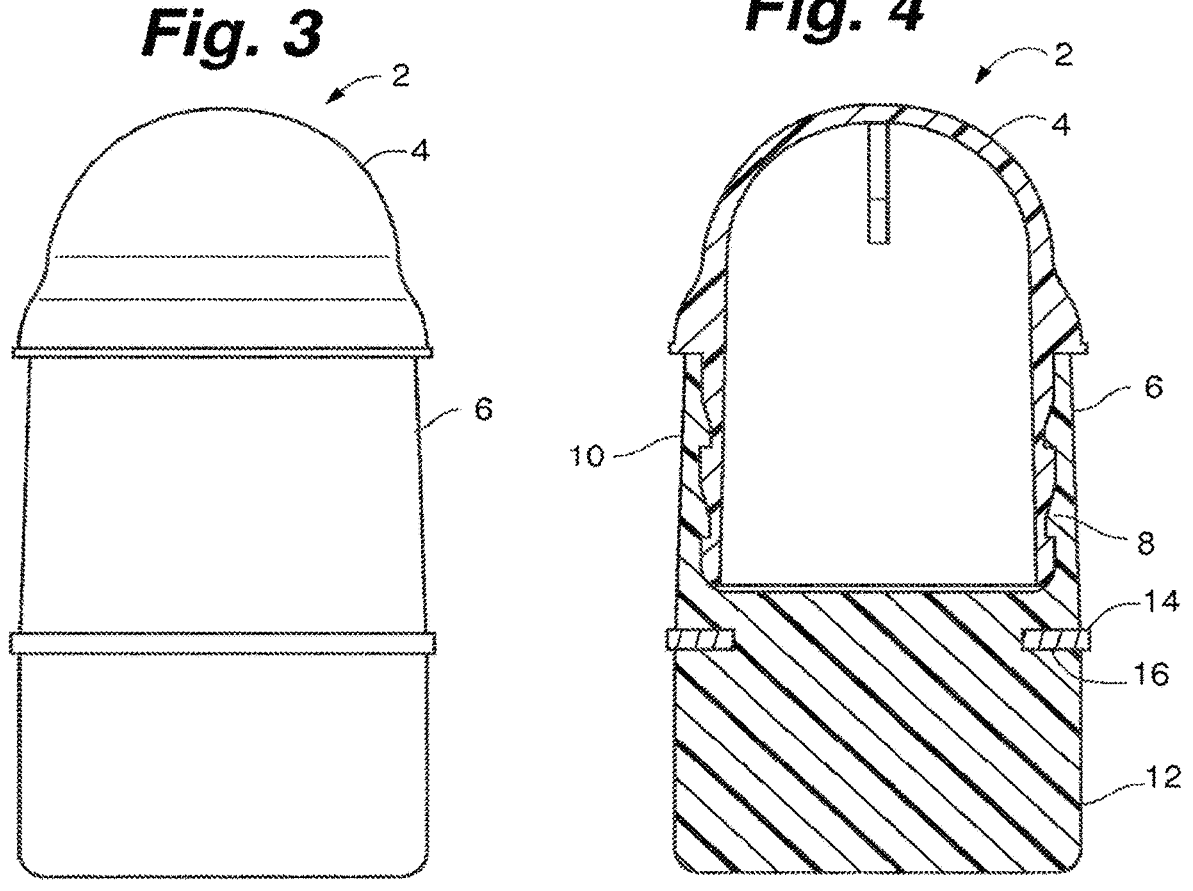
FIG. 3 is a side view of a non-lethal projectile with a driving band according to an embodiment of the present invention.
FIG. 4 is a cross-sectional side view of the non-lethal projectile depicted in FIG. 3.

The following detailed description is merely exemplary in nature and is not intended to limit the various embodiments or the application and uses thereof. Furthermore, there is no intention to be bound by any theory presented in the preceding background or the following detailed description. Conventional techniques related to the compositions, methods, processes, and portions thereof set forth in the embodiments herein may not be described in detail for the sake of brevity. Various tasks and process steps described herein may be incorporated into a more comprehensive procedure or process having additional steps or functionality not described in detail herein for being well-known and readily appreciated by those of skill in the art. As such, in the interest of brevity, such conventional steps may only be mentioned briefly or will be omitted entirely without providing well-known process details.

Non-lethal cartridges and related components are provided herein. The cartridges include nonlethal projectiles comprising a marking compound (i.e., marking projectiles), and are adapted specifically for use with firearms. The marking composition exhibits excellent accuracy, precision, and marking performance, as well as material compatibility, temperature insensitivity, and storability. These features of the marking composition provide the corresponding projectiles and cartridges with increased (widened) range of suitable operating conditions as well as improved post-storage utility, without sacrificing accuracy, precision, and marking performance during end-use operations. As such, it will readily be appreciated that the present embodiments provide distinct advantages over prior marking compositions and projectiles utilizing the same, with specific improvements relating to aging tolerance and performance maintenance over time, adverse condition exposure, and operating range.

Details and features of the marking projectile and cartridges, as illustrated in various FIGS., are set forth below, followed by general embodiments of the marking composition.

A non-lethal projectile 2, according to certain aspects of the present invention, can comprise a shell having two or more parts that connect together to form an interior cavity 50. A marking composition can be inserted within the interior cavity 50, the marking composition having a greater viscosity at low shear rates to spin-stabilize the projectile during flight and a lower viscosity at higher shear rates to properly disperse the marking composition upon impact with the target. Upon impact with the target, the marking composition shears against pieces or shards of the shell at high shear rates such that the viscosity of the marking composition is much lower compared to the in flight viscosity of the marking composition. During the initial rotation of the non-lethal projectile 2, there is shear between the walls of the shell and the marking composition, as well as between the marking composition and itself. It is desirable that the marking composition have enough viscosity, at the shear rate imparted by the rotation, that the rotation does not cause the marking composition to move around inside the projectile; but instead, to properly rotate with the shell such that the non-lethal projectile is spin-stabilized and does not tumble. When the projectile strikes a target, the velocity of the projectile drops to zero immediately, leading to a high shear event. The high shear drops the viscosity of the marking composition enough to allow the fluid to leave the projectile shell and deposit or disperse onto the target.

As shown in FIGS. 1 to 4, a non-lethal projectile 2, according to an embodiment of the present invention, comprises a frangible cap 4 and a projectile body 6. The frangible cap 4 can further comprise an engagement portion 8 for affixing the cap 4 to the projectile body 6. The projectile body 6 can further comprise a cup portion 10 and a base portion 12. For example, the engagement portion 8 may be receivable within the cup portion 10 to affix the cap 4 to the projectile body 6 and to define a cavity for receiving marking media. In other embodiments, the cap 4 receives the cup portion 10. In one aspect, the projectile can further comprise a driving band 14 extending around the exterior of the projectile body 6. The driving band 14 can be positioned around the base portion 12 of the projectile body 6. A portion of the driving band 14 protrudes from outward from the projectile body 6 to engage the rifling of a barrel the projectile 2 is fired through. The projectile body 6 can further comprise a groove 16 for receiving a portion of the driving band 8 to prevent the driving band 14 from moving axially during firing.

According to certain aspects, the projectile 2 can be sized to replicate the size of the bullet for 5.56×45 mm NATO ("5.56 NATO") or 0.223 REMINGTON ammunition. The conventional bullets of 5.56 NATO cartridges and 0.223 REMINGTON have a diameter of 0.224 in (5.70 mm). In one aspect, the driving band 14 can have an outer diameter of 0.223 in (5.66 mm) and a thickness of 0.005 (0.127 mm) in such that a portion of the driving band 14 protrudes from the projectile body 6 for engaging the rifling of barrels sized for 5.56 NATO or 0.223 REMINGTON ammunition. According to an embodiment, the inner diameter of the driving band 14 can comprise 0.154 in (3.912 mm) such that a portion of the driving band 14 is seated within the projectile body 6.

Although the projectile 2 is sized to approximate the conventional equivalent, the weight of the projectile 2 is less than the conventional equivalent. For example, a conventional bullet weight for a 5.56 NATO bullet can be about 4 grams, although such weights are often reported in "grains" (gr), with a basis of 15.4 grains per gram. In some embodiments, the total weight of the projectile 2 for simulating 5.56 NATO bullet and containing a payload media can weight about 0.17, alternatively 0.24 grams wherein the driving band 8 comprises about 15% of the total weight of the projectile 2; in other embodiments, from 10 to 20%. In aspect, the total weight of the projectile 2 with a payload media can be about 5 to 10% of the weight of the equivalent projectile.

In another aspect, the total "empty" weight of the projectile 2 without a payload media can be about 1 to 5% of the weight of an equivalent conventional projectile 2. In embodiments the total weight of the projectile is less than 5 grains. In embodiments the total weight of the projectile is less than 6 grains. In embodiments the total weight of the projectile is less than 7 grains. In embodiments the total weight of the projectile is less than 10 grains. Projectiles of less than 4.25 grains can be fired from telescoping 5.56 mm practice cartridges using only the primer as the energetic component (i.e., where no discreet propellant is included or necessary), at velocities up to about 520 fps using the metal driving band 14. With such velocities accuracy is extremely good and the kinetic energy is under 62 ft-lb/inch$^2$. This arrangement provides better accuracy and less energy than conventional 5.56 mm practice ammunition with marking projectiles. With less energy, the ammunition is safer.

While the projectile is described about with respect to 5.56 NATO, it is to be appreciated that the caliber is not limited and, as provided by the examples, may be selected from pistol or rifle calibers. For example, in some embodiments, the projectile is about a 5.56 mm caliber projectile and has a weight of from about 0.15 to about 0.4 grams. In other embodiments, the projectile is about a 6.8 mm caliber projectile and has a weight of from about 0.2 to about 0.5 grams. In yet other embodiments, the nonlethal projectile 28 is about a 7.62 mm caliber projectile and has a weight of from about 0.2 to about 0.6 grams. In specific embodiments, the nonlethal projectile 28 is about a 9 mm caliber projectile and has a weight of from about 0.3 to about 0.7 grams.

It will be appreciated that the weight of the projectile influences the energetic material selection for propelling the projectile during firing. As described herein, the energetic material may be in the form of a primer, a propellant, or a combination thereof. In some embodiments, multiple primers (i.e., at least two primers) may be used without the need for a discreet propellant (e.g. a nitrocellulose-based energetic material) to be included. In general, the combination of primer(s) and propellant may be referred to as a "propellant system", although such system may not strictly require the discreet propellant, as described above. Additionally, the provision for propelling the projectile without discreet propellant can be coupled with a cycling system (e.g. such that the cartridge may include both the propelling system and the cycling system. In such instances, the cycling system may also comprise a primer (e.g. a centerfire or rimfire primer) as an energetic material adapted to cycle the firearm upon firing. Accordingly, it will be appreciated that the projectile, marking composition, and related components may be coupled with a dual-primer charged cartridge adapted to both safely propel the projectile from the casing and also to cycle the firearm, without the use of conventional propellants.

The projectile body 6 can comprise principally a thermoplastic polymer. Other embodiments can comprise ceramic, compressed fibrous pulp, lightweight metal or other lightweight material that can be formed to define the projectile body 6. A variety of rigid grade polymers can be used to form the projectile body 6, such as, for example, polyamide (e.g., nylon(s)), high density polyethylene, PVC blends, acetal polymers (e.g., Delrin®), or the like. In some embodiments, the projectile body 6 includes acetal homopolymer, acetal copolymer, or a combination thereof to provide adequate engraving resistance, excellent dimensional stability, relatively high melting point and low barrel fouling characteristics. In certain embodiments, a hard polymer material, e.g. having a hardness of at least 100 Rockwell R, such as from about 100 to about 140 Rockwell R, is utilized.

The frangible cap 4 can comprise a frangible material adapted to fracture upon impact with the target to release the payload within the cavity and/or reduce force with which the projectile 2 impacts the target. In certain embodiments, a soft polymer material is used to form the cap 4, e.g. as a polymer front shell projectile portion. Relatively flexible polymers, such as a flexible grade of polyolefins (e.g. polypropylene and/or a thermoplastic olefin (TPO)) are examples of suitable soft materials for this application. Soft polymer materials may include those having a Shore D hardness of from about 35 to about 65, such as from about 40 to about 60, alternatively from about 40 to about 50.

The particular materials for the body 6 and cap 4 will be selected in view of the formulation of the marking composition, which is described in further detail below, and the method for loading the same into the projectile 2.

The driving band 14 can comprise a gilding metal, a rigid polymer different from the polymer used to form the projectile body 6 or a metal impregnated polymer. In certain embodiments, the driving band 14 comprises 110 Copper (99.9% copper, 0.04% oxygen). The material of the driving band 14 may provide more advantageous engagement characteristics than the base material of the projectile body 6. For example, better coefficient of friction with respect to firearm barrels, less sloughing of material, easier deformation to conform to the rifling of the barrel.

Figures 5, 6:
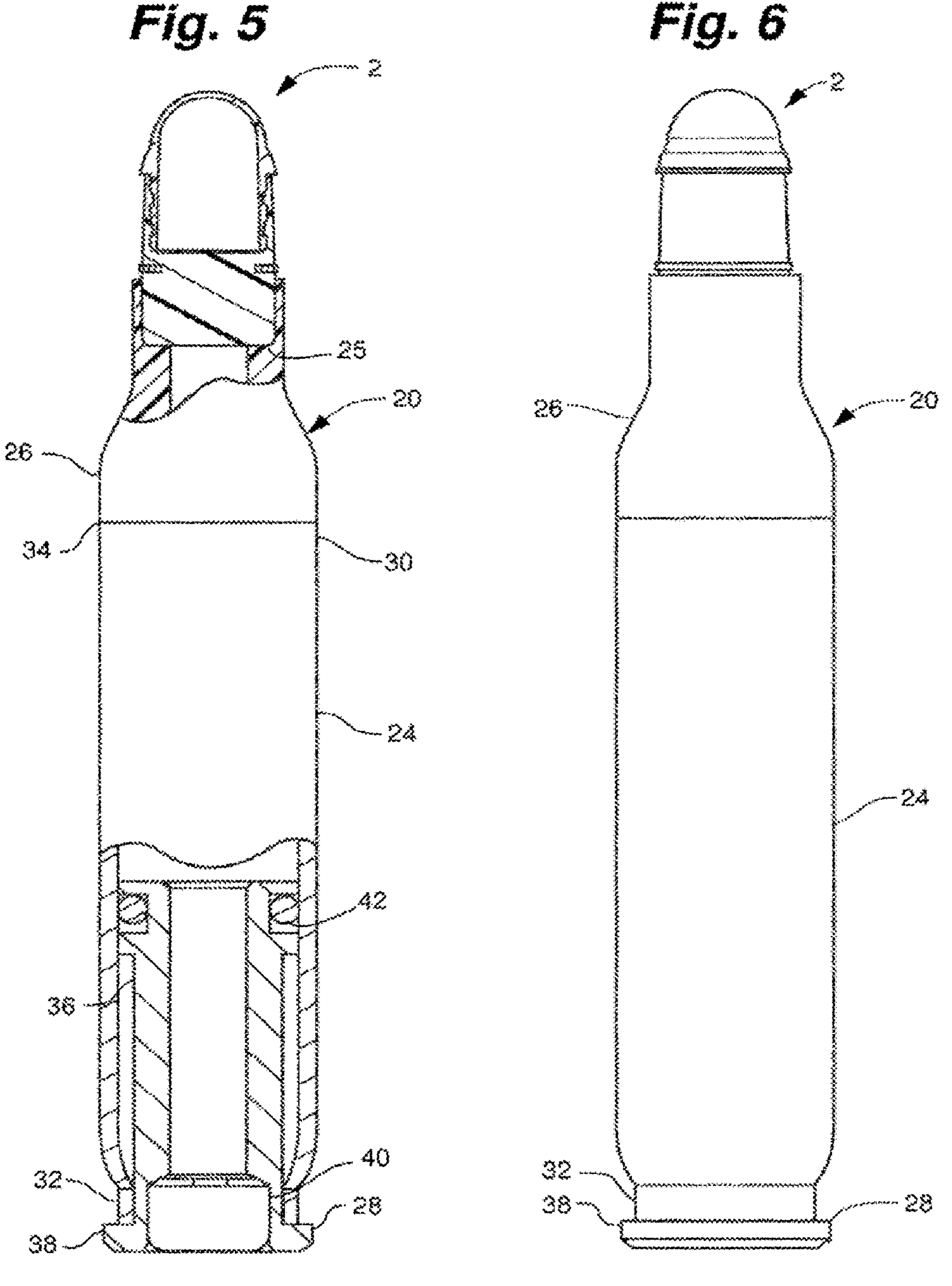
FIG. 5 is a partial cross-sectional side view of a non-lethal cartridge for firing a non-lethal projectile having a driving band according to an embodiment of the present invention.
FIG. 6 is a side view of the non-lethal cartridge depicted in FIG. 5.

As shown in FIGS. 5 to 6, the non-lethal projectile 2 can be fired from a reduced energy cartridge 20 adapted to propel the projectile 2 with gases generated only by a primer 22 (i.e., where the primer 22 is the energetic material, and no discreet propellant is utilized). The cartridge 20 further comprises a cartridge casing 24, a neck portion 26 and a telescoping insert 28 adapted to telescope upon firing to trigger the cycling mechanism of the firearm. The cartridge casing 24 defines an internal cavity having a first opening 30 and a second opening 32. The neck portion 26 can comprise an insert portion 34 receivable within the first opening 30 affix the neck portion 26 to the cartridge casing 24.

The neck portion 26 can also comprise a seating portion 25 for receiving the projectile 2. According to an embodiment, the neck portion 26 can be shaped to fit within the chamber of a firearm sized for 5.56 NATO cartridges. According to an embodiment, the neck portion 26 can comprise a glass filed nylon that is resistant to the temperatures associated with the hot gases.

The telescoping insert 28 comprises a telescoping portion 36 and a rim 38. The telescoping portion 36 is receivable within the second opening 32 such that the rim 38 is positioned against the second opening 32. The telescoping insert 28 defines a channel 40 for receiving the primer 22 and adapted to channel gases generated by igniting the primer 22 toward the projectile 2. According to an embodiment, the telescoping portion 26 can further comprise a gasket 42 engageable to the casing 24 to prevent gases from escaping between the telescoping portion 26 and the casing 24.

During firing, the projectile 2 travels through the rifled barrel of the firearm and engages the rifling of the barrel. In one aspect, the driving band 14 is engraved by the rifling of the barrel. The rifling imparts a spin to the projectile 2 such that the projectile 2 is spin stabilized once the projectile 2 leaves the barrel. The driving band 14 comprises a material of sufficient hardness that permits the driving band 14 to be etched in the same way as a conventional bullet. After the initial etching, the projectile 2 travels through the barrel with minimal friction. Upon impact with the target, the frangible cap 4 fractures dispensing the marking media contained within the cup portion 10 at the impact site.

It will be appreciated that variations free from rifling engagement means (e.g. driving band 14) may also be utilized in combination with the marking composition herein, and likewise that cartridges adapted for use with smooth-bore firearms, air guns, or other markers may also be utilized. Typically, however, the marking composition provides spin-stability and related performance improvements and thus exemplary embodiments evidence application with rifled or otherwise spin-imparting barrel or projectile systems.

In view of the exemplary embodiments of the marking projectile and cartridge set forth above, the particular components and parameters of the marking composition are set forth below and will be further understood in view of the examples provided herein.

More specifically, as demonstrated in the Examples, the marking composition exhibits good flight performance, storability, condition insensitivity, and marking performance, and also excellent material compatibility and tolerance, and workability (e.g. in formulation and production). Moreover, the specific formulation of the marking composition provides for good washability (e.g. after impact on a target, i.e., a marked target) in combination with the aforementioned advantages, which are typically competing characteristics within marking compositions generally. Those of skill in the art will appreciate that the combination of features in the specific embodiments herein, which are illustrated by nature of the marking projectiles and firearm cartridges provided, are unique in terms of achieving preflight, in-flight, and post-impact characteristics unattainable with conventional marking compositions and projectiles.

The marking composition generally comprises a carrier, a thickener, a surfactant, and a colorant. Other components may be included as well, such as certain additives or fillers, and, in some instance, the colorant may be omitted.

In general, it is to be appreciated that the marking composition is nonaqueous, i.e., substantially free from water. While certain components may be hygroscopic, it will nonetheless be understood that water is not formulated into the marking composition as a discreet component, but rather is avoided, minimized, or eliminated to the extent practical in the preparation of the marking compound. As such, while certain components of the marking composition may be selected from those used in other marking compositions, it is to be understood that, in the context of the present embodiments, the nonaqueous nature of the marking composition herein provide unique and unexpected benefits over conventional water-based compositions. Likewise, the absence of an aqueous component in a marking composition suitable for firearm cartridge application is itself an advancement over compositions used in air gun or other applications where robust, precise, accurate, and repeated results are not required to withstand the mechanical and physical challenges associated with firing, compatibility with production equipment and cartridge components, and other limiting characteristics of firearm cartridge-based ballistic applications.

Additionally, while the marking composition is nonaqueous, the components of the marking composition are typically selected from water-soluble, biodegradable or biocompatible, and non-toxic components, such that use of the marking projectile is not hazardous by virtue of the marking composition formulation. Accordingly, the components may be prepared or otherwise obtained, and may be from synthetic and/or biological sources. In some instances, one or more of the components will be selected from sustainable materials or feedstocks, such as biosynthetic compounds, naturally produced or derived compounds, etc. In this way, the marking composition, as well as the projectile, may be considered "green" chemicals/materials.

The carrier (or carrier vehicle) of the marking composition is a solvent, diluent, and/or dispersant. Carrier vehicles are known in the art, and generally comprise solvents, fluids, oils, and the like, as well as combinations thereof. The carrier of the marking composition typically comprises an organic solvent. The selection of the carrier is not made in isolation, but rather is to be selected in view of the other components of the marking composition as set forth herein as well as the components of the projectile/casing or cartridge in general. The carrier is typically water soluble (although substantially free from water) and non-volatile (i.e., substantially free from volatile organic compounds or "VOCs"), while also being noncorrosive and nonoxidative. Similarly, the marking composition itself is typically substantially free from odor, or at least substantially free from offensive/unpleasant odors. Scents or other compounds may be utilized in certain embodiments.

Organic solvents suitable for use in or as the carrier are exemplified by low-Mw polyalkylene glycols (PAGs), i.e., poly(C2-C4 alkylene) glycols. Such PAGs will be understood to include polyethylene glycols (PEGs), polypropylene glycols (PPGs), and polybutylene glycols (PBGs), as well as alkylene glycol or other alkylene oxide-functionalized ethers and esters, and combinations thereof. Examples of ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, octyl palmitate, and the like, as well as combinations thereof.

As introduced above, the components of the carrier (e.g. the organic solvent) are typically water soluble. Examples of such carriers include glycerols, sorbitols, ethylene glycols, propylene glycols, hexylene glycols, polyethylene glycol (PEG), ethers of diethylene and dipropylene glycols (e.g. methyl, ethyl, propyl, and butyl ethers, etc.), and the like, as well as derivatives, modifications, and combinations thereof. Specific examples of such organic solvents used in various embodiments in, or as, the carrier vehicle include PEG200, PEG300, PEG400, PEG600, glyceryl diacetate (diacetin), triethylene glycol, propylene glycol, tripropylene glycol, diethylene glycol butyl ether, tri(propylene glycol) methyl ether, and the like, as well as combinations thereof. Other organic solvents may also be utilized in or as the carrier, such as in the form of a cosolvent or compatibilizer. Likewise, alternative organic solvents may also be useful, e.g. in place of one or more of those listed above, depending on the particular properties and interactions with the other components of the marking composition.

In specific embodiments, the organic solvent comprises a PAG having a weight average molecular weight (Mw) of from about 150 to about 600, alternatively of from about 200 to about 300. In some such embodiments, the organic solvent comprises a PEG having a Mw in one of the aforementioned ranges. In specific embodiments, the organic solvent comprises, alternatively consists essentially of, PEG 200, PEG 300, or a combination thereof. In particular embodiments, the organic solvent consists essentially of PEG 200.

The organic solvent is typically present in the marking composition in an amount of from about 55 to about 85 wt. %, based on the total weight of the marking composition. For example, in specific embodiments, the marking composition comprises from about 60 to about 81 wt. %, alternatively from about 63 to about 81 wt. % of the organic solvent. In specific embodiments, the organic solvent comprises PEG 200 and composes from about 65 to about 81 wt. % of the marking composition, such as from about 68 to about 81 wt. %, alternatively from about 70 to about 81 wt. %, alternatively from about 70 to about 76 wt. %, based on the total weight of the marking composition.

The thickener or thickening agent is a rheology modifier, and is generally selected to alter the viscosity, flow property, and/or foaming property (i.e., foam-forming ability and/or foam stability, etc.) of the marking composition. The marking composition is shear-thinning, i.e., exhibits a greater viscosity at low shear rates and a lower viscosity at higher shear rates. In practice, the marking composition provides the projectile with spin-stabilization during flight (i.e., low-shear) and functional dispersal on impact (i.e., high-shear), e.g. during the marking composition shearing against pieces of the projectile shell upon such impact with a target, this allowing for improved in-flight performance (e.g. accuracy, precision, range etc.) as well as impact performance (e.g. marking, fragmentation, etc.). As such, the thickener is selected to work in tandem with the carrier to provide the rheological profile required by the embodiments herein, and thus may be characterized as a stabilizer, viscosity modifier, thixotropic agent, etc., or combinations thereof. In general, the thickener comprises one or more water soluble and/or water compatible thickening compounds. However, specific selection of the thickener is to be made in view of the other components of the marking composition and, in particular, the carrier, to provide the marking composition with sufficient phase stability without jeopardizing, or in some instances actually improving, the rheology profile.

In exemplary embodiments, the thickener comprises, alternatively is, a functionalized silica. It is known that silica increases viscosity of compositions through formation of loose networked structures comprising dispersed silica particles held together by hydrogen bonding and long-range electrostatic forces. Untreated hydrophilic fumed silica thickens fluids by hydrogen bonding via surface silanol (Si—OH) groups, whereas surface treatment (e.g. with a silicone compound) of such silica relies on covalently bonding the treatment agent (e.g. a polydiorganosiloxane) to a portion of the surface hydroxyl groups. Typically, such treatment utilizes silicones or organisilicon/siloxy compounds (e.g. chlorotrimethylsilane, 1,1,1,3,3,3-hexamethyldisilazane, etc.) to render the silica hydrophobic, with the degree of hydrophobicity being tailored by controlling the relative amounts of free silanol groups on the surface, the specific treatment agent selected, the amount used, etc. In this fashion, a silica can be fully treated and provide a lower degree of thickening to the marking composition due to the number of hydrogen bonding sites being limited and the hydrophobicity of the silica being increased (e.g. when the thickening agent is a polydimethylsiloxane (PDMS)-functionalized fumed silica). Alternatively, depending on the particular treatment agent, the functional hydrophobic handles on the silica may have increased interaction with the carrier and provide increased thickening performance over other treated or even untreated silica-based thickeners. The thickening agent will be generally selected to increase the viscosity of the marking composition while maintaining shear-thinning behavior. As such, the amount and type of surface treatment will control the particular compatibility with the carrier selected.

In general, it will be understood that a fumed silica is considered to be "fully treated" when the surface no longer reacts with a treatment agent. The degree of treatment is typically assessed via determination of carbon content, which increases corresponding to increased treatment level. In general, for typical fumed silica, a carbon level below about 3% is indicative of only partial treatment and levels above about 3% indicate more complete and up to full treatment. That said, it is to be understood that the carbon content will vary depending on the type of surface treatment (e.g. length of PDMS, type of treatment agent, etc.), as larger treatment agents generally result in higher carbon contents in fully treated fumed silica. Moreover, the phase stability and performance of the marking composition is influenced by the particular carrier and thickener selected, as well as the proportions utilized. As such, it is to be understood that the type of surface treatment and the level of coverage of the surface treatment may influence the thickening efficiency of the fumed silica in the marking composition. That said, it is known that fully-treated fumed silicas may build viscosity to a greater degree in glycol-based fluids compared to other solvents, such that fully-treated fumed silica thickening agents may perform unexpectedly better in terms of viscosity build and shear-thinning rheology control in the present embodiments.

In some embodiments, the thickening agent is selected by particle size, e.g. from solid-form thickeners consisting of submicron particles. In such embodiments, the marking composition may be formulated as a colloidal dispersion.

Examples of suitable thickening agents include fumed silicas commercially available from Cabot Corporation under the CABOSIL® (or CAB-O-SIL®) tradename, such as CABOSIL® EH5, CABOSIL® M5, CABOSIL® TS530, CABOSIL® TS610, CABOSIL® TS720, and CABOSIL® Ultrabond and Ultrabond 5780; as well as those available from Degussa AG under the AEROSIL® tradename, such as AEROSIL® 200, AEROSIL® R202, AEROSIL® R208, AEROSIL® 380, AEROSIL® R972, and AEROSIL® R974. Other variations and combinations of these example may also be utilized, although it is to be understood that the various grades differ in the type and level of surface treatment. For example, CABOSIL® EH5, CABOSIL® M5, AEROSIL® 200, and AEROSIL® 380 exemplify untreated, i.e., hydrophilic silicas; whereas CABOSIL® TS610, AEROSIL® R974, and AEROSIL® R972 exemplify partially-treated fumed silicas (e.g. indicated by a carbon contents of less than about 2%); and CABOSIL® TS530, CABOSIL® TS720, and AEROSIL® R202 exemplify fully-treated fumed silicas (e.g. as indicated by carbon contents greater than about 3%). Typically, partially or fully-treated fumed silica(s) are selected. In specific embodiments, for example, the thickening agent comprises, alternatively consists essentially of, one or more fully-treated fumed silicas (e.g. CABOSIL® TS720, AEROSIL® R202, etc.) or combinations thereof. CABOSIL® TS720 or AEROSIL® R202 are fully polydimethylsiloxane (PDMS)-treated fumed silica, in which the treatment agent is a PDMS with a Mw of from about 681 to about 11,189 (i.e., about 8-150 dimethylsiloxane monomer or "D" units, on average).

The thickener is typically present in the marking composition in an amount of from about 10 to about 20 wt. %, based on the total weight of the marking composition. For example, in specific embodiments, the marking composition comprises from about 10 to about 19 wt. %, alternatively from about 11 to about 19 wt. %. In specific embodiments, the thickener comprises a fully polydimethylsiloxane (PDMS)-treated fumed silica (e.g. with a carbon content greater than about 3%) and composes from about 11 to about 19 wt. % of the marking composition, such as from about 12 to about 18, alternatively from about 12 to about 16 wt. % of the thickener, based on the total weight of the marking composition.

In some embodiments, the amount of carrier and/or thickener is selected to provide the marking composition with a particular ratio of the two components. For example, as described in further detail below, the marking composition may be formulated to achieve a certain viscosity by maintain a ratio of carrier (P) to thickener (S) of below about 4.20 (P:S) or above about 5.76 (P:S). Typically, the upper and lower limits will vary, as will the scope of the gap therebetween. In some embodiments, however, a P/S ratio between these two values provides the marking composition with a viscosity outside of optimal performance range under some conditions, e.g. whereby low-temperature accuracy results typically fall below the acceptable performance requirements. The selection of the high/low threshold values for suitable P/S ranges will be determined and selected by those of skill in the art in view of the examples herein. In specific embodiments, the marking composition comprises the organic solvent and the thickener in a wt./wt. of from about 3.5 to about 4.5 or from about 5.6 to about 6.3, alternatively from about 4 to about 4.2 or from about 5.76 to about 6.25 wt./wt. of from about 3.5 to about 4.5 or from about 5.6 to about 6.3, alternatively from about 4 to about 4.2 or from about 5.76 to about 6.25. In some such embodiments, the organic solvent comprises the low-Mw polyethylene glycol and the thickener comprises the polydimethylsiloxane-functionalized fumed silica. In specific such embodiments, the organic solvent, alternatively the carrier, consists essentially of one or more polyethylene glycols having Mw of from about 150 to about 600, alternatively of from about 200 to about 300, and the thickener comprises one or more fully PDMS-treated fumed silica.

In specific embodiments, the thickener is free from cellulose polymer. In such embodiments, the marking composition itself is typically free from cellulose polymer.

As introduced above, the marking composition comprises a surfactant. The surfactant may comprise one or more anionic, cationic, nonionic, and/or amphoteric surfactants, such as any one or more of those described below. In general, the surfactant is selected to impart, alter, and/or facilitate certain properties of the marking composition during formulation, storage, as well as during and after application (i.e., firing, impact, and cleanup of the marking composition), such as compatibility, wetting, foaming, and washability. Typically, the surfactant is selected from water soluble surfactants.

Typically, the surfactant comprises an ionic surfactant, and in exemplary embodiments comprises a mixture of at least two different ionic surfactants. Examples of anionic surfactants include carboxylates (sodium 2-(2-hydroxyalkyloxy)acetate)), amino acid derivatives (N-acylglutamates, N-acylgly-cinates or acylsarcosinates), alkyl sulfates, alkyl ether sulfates and oxyethylenated derivatives thereof, sulfonates, isethionates and N-acylisethionates, taurates and N-acyl N-methyltaurates, sulfosuccinates, alkylsulfoacetates, phosphates and alkyl phosphates, polypeptides, anionic derivatives of alkyl polyglycoside (acyl-D-galactoside uronate), and fatty acid soaps, alkali metal sulforicinates, sulfonated glyceryl esters of fatty acids such as sulfonated monoglycerides of coconut oil acids, salts of sulfonated monovalent alcohol esters such as sodium oleylisethianate, amides of amino sulfonic acids such as the sodium salt of oleyl methyl tauride, sulfonated products of fatty acids nitriles such as palmitonitrile sulfonate, sulfonated alpha olefins (e.g. mixed C14-C16 alkyl sulphonates), sulfonated aromatic hydrocarbons such as sodium alpha-naphthalene monosulfonate, condensation products of naphthalene sulfonic acids with formaldehyde, sodium octahydroanthracene sulfonate, alkali metal alkyl sulfates such as sodium lauryl sulfate, ammonium lauryl sulfate and triethanol amine lauryl sulfate, ether sulfates having alkyl groups of 8 or more carbon atoms such as sodium lauryl ether sulfate, ammonium lauryl ether sulfate, sodium alkyl aryl ether sulfates, and ammonium alkyl aryl ether sulfates, alkylarylsulfonates having 1 or more alkyl groups of 8 or more carbon atoms, alkylbenzenesulfonic acid alkali metal salts exemplified by methylbenzenesulfonic acid sodium salt (i.e., sodium toluene sulfonate), sodium xylenesulfonate, hexylbenzenesulfonic acid sodium salt, octylbenzenesulfonic acid sodium salt, decylbenzenesulfonic acid sodium salt, dodecylbenzenesulfonic acid sodium salt, cetylbenzenesulfonic acid sodium salt, and myristylbenzenesulfonic acid sodium salt, sulfuric esters of polyoxymethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid, and the like, as well as derivatives, modifications, and combinations thereof. In some embodiments, the surfactant comprises at least anionic surfactant selected from organic sodium sulfonates, such as any of those above (e.g. alkyl sulfonates including alpha olefin sulfonates, alkylaryl sulfonates including alkyl benzene sulfonates such as sodium xylene sulfonate, etc., and combinations thereof). In specific embodiments, the surfactant comprises at least one alkyl sulfonate and at least one aryl sulfonate. In particular such embodiment, the surfactant comprises at least one sodium C14-C16 alpha olefin sulfonate and at least one sodium xylenesulfonate.

In addition to the anionic surfactant, the surfactant component of the marking composition may comprises a cationic surfactant, nonionic surfactant, and/or amphoteric surfactant.

Examples of cationic surfactants include various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines such as undecylimidazoline, fatty amides derived from disubstituted amines such as oleylaminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides such as octyltrimethylammonium hydroxide, dodecyltrimethylammonium hydroxide, and hexadecyltrimethylammonium hydroxide, dialkyldimethylammonium hydroxides such as octyldimethylammonium hydroxide, decyldimethylammonium hydroxide, didodecyldimethylammonium hydroxide, dioctadecyldimethylammonium hydroxide, tallow trimethylammonium hydroxide, coconut oil, trimethylammonium hydroxide, methylpolyoxyethylene cocoammonium chloride, and dipalmitylhydroxyethylammonium methosulfate, amide derivatives of amino alcohols such as beta-hydroxylethylstearylamide, amine salts of long chain fatty acids, and the like, as well as derivatives, modifications, and combinations thereof.

Examples of nonionic surfactants include polyoxyethylene alkyl ethers (such as, lauryl, cetyl, stearyl or octyl), polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, polyoxyalkylene-substituted silicones (rake or ABn types), silicone alkanolamides, silicone esters, silicone glycosides, dimethicone copolyols, fatty acid esters of polyols, for instance sorbitol and glyceryl mono-, di-, tri- and sesqui-oleates and stearates, glyceryl and polyethylene glycol laurates; fatty acid esters of polyethylene glycol (such as polyethylene glycol monostearates and monolaurates), polyoxyethylenated fatty acid esters (such as stearates and oleates) of sorbitol, and the like, as well as derivatives, modifications, and combinations thereof.

Examples of amphoteric surfactants include amino acid surfactants, betaine acid surfactants, trimethylnonyl polyethylene glycol ethers and polyethylene glycol ether alcohols containing linear alkyl groups having from 11 to 15 carbon atoms, such as 2,6,8-trimethyl-4-nonyloxypolyethylene oxyethanol (6 EO), 2,6,8-trimethyl-4-nonyloxypolyethylene oxyethanol (10 EO), alkylene-oxypolyethylene oxyethanol ($C_{11-15}$ secondary alkyl, 9 EO), and alkylene-oxypolyethylene oxyethanol ($C_{11-15}$ secondary alkyl, 15 EO), octylphenoxy polyethoxy ethanols having varying amounts of ethylene oxide units such as octylphenoxy polyethoxy ethanol (40 EO), alkali metal salts of dialkyl sulfosuccinates, polyethoxylated quaternary ammonium salts and ethylene oxide condensation products of the primary fatty amines, polyoxyalkylene glycol modified polysiloxanes, N-alkylamidobetaines and derivatives thereof, proteins and derivatives thereof, glycine derivatives, sultaines, alkyl polyaminocarboxylates and alkylamphoacetates, and the like, as well as derivatives, modifications, and combinations thereof. These surfactants may also be obtained from various suppliers under numerous tradenames.

In typical embodiment, the surfactant is solid at room temperature. In specific embodiments, the surfactant is used in a processed form. For example, in some such embodiments, the surfactant is utilized in a spray-dried from. Examples of such forms are typically dry particulates, such as powders, beads, etc. In particular embodiments, the surfactant is in the form of a spray-dried powder or bead.

In some embodiments, the surfactant is selected on the basis of one or more performance parameters, such as a wetting test (e.g. by time), a foaming test (e.g. by height), water solubility, cloud point, critical micelle concentration, etc. For examples, in particular embodiments the surfactant exhibits a Draves wetting test time of less than about 30 seconds, a Ross-Miles foam test (e.g. via RMFA) height of at least about 12 cm, water solubility, a cloud point around about 7 C, a critical micelle concentration of about 301 mg/ml, or a combination thereof.

The surfactant may be included in the marking composition are varying concentrations, e.g. depending on the particular selection and amounts of the carrier and thickener components therein, the particular surfactant(s) selected for the surfactant component, etc. Typically, the surfactant is utilized in an amount of from greater than 0 to about 15, alternatively from about 1 to about 12 wt. %, based on the total weight of the marking composition. In some embodiments, the surfactant is utilized in an amount of from about 2 to about 12, alternatively from about 4 to about 12, alternatively from about 6 to about 12, alternatively from about 8 to about 12 wt. %, based on the total weight of the marking composition.

In specific embodiments, the surfactant is free from defoamers. In such embodiments, the marking composition itself is typically free from defoamers.

In general embodiments, the marking composition comprises the colorant (e.g. a pigment, dye, etc.). The colorant is selected as such, i.e., to impart color to the marking composition and thus improve and/or change the visibility of marks created therewith. As with the other components, the colorant is generally selected from water-soluble compounds to maintain and/or improve washability of the marking composition.

Examples colorants include surface treated or untreated iron oxides, surface treated or untreated titanium dioxide, surface treated or untreated mica, silver oxide, silicates, chromium oxides, carotenoids, carbon black, ultramarines, chlorophyllin derivatives and yellow ocher. Examples of organic pigments include aromatic types including azo, indigoid, triphenylmethane, anthraquinone, and xanthine dyes which are designated as D&C and FD&C blues, browns, greens, oranges, reds, yellows, etc., and mixtures thereof. Surface treatments include those treatments based on lecithin, silicone, silanes, fluoro compounds, and mixtures thereof.

In some embodiments, the colorant comprises a thermoset pigment, such as a fluorescent thermos set pigment. Such pigments are know to be solvent-resistant and highly stable, and provide compositions with uniform an repeatable coloring. Examples of such pigments are those available commercially from DayGlo Color Corp under the product/series lines "T" and "GT" pigments, which include branded colorants such as T-11 Aurora Pink®, T-13 Rocket Red™, T-14 Fire Orange™, T-15 Blaze Orange™, T-16 Arc Yellow™, T-17N Saturn Yellow®, T-18N Signal Green™, T-19 Horizon Blue™, GT-11 Aurora Pink®, GT-13 Rocket Red™, GT-14N Fire Orange™, GT-15N Blaze Orange™, GT-17N Saturn Yellow®, and GT-21 Corona Magenta™ Exemplary embodiments of the marking composition comprise one or more of the "T-series" pigments. In certain embodiments, additional colorants may also be utilized.

The colorants may be included in the marking composition are varying concentrations, e.g. depending on the particular final color desired, the components being utilized, etc. Typically, the colorant is utilized in a total amount (i.e., cumulative of all colorant compounds) of from greater than 0 to about 12 wt. %, alternatively from about 0.1 to about 10 wt. %, alternatively from about 1 to about 10 wt. %, based on the total weight of the marking composition. In some embodiments, the colorant is utilized in an amount of from about 1 to about 6, alternatively from about 1 to about 5, alternatively from about 2 to about 5, alternatively from about 2 to about 4 wt. %, alternatively of about 2.5 wt. %, based on the total weight of the marking composition.

In some embodiments, the marking composition is substantially free from colorants. As such, while the colorant is generally included in the examples of the marking compound, it is to be understood as an optional component in some aspects of the embodiments herein. However, when included, care must be taken in the overall formulation, as described herein, to maintain the physical properties of the marking composition in the functional ranges.

The marking composition may comprise one or more additional components/additives, i.e., other than those described above, which are known in the art and will be selected based on the particular components utilized in the marking composition. For example, the marking composition may comprise: a filler; a filler treating agent; a surface modifier; a binder; a compatibilizer; an anti-aging additive; a corrosion inhibitor; a UV absorber; an anti-oxidant; a light-stabilizer; a heat stabilizer; and the like, as well as derivatives, modifications, and combinations thereof.

In general, the marking composition is non-corrosive. Moreover, the marking composition is compatible with typical safety lens materials, such that it will not dissolve, cloud, or otherwise harm the lens in terms of structure integrity or visual clarity (i.e., once cleaned off). Likewise, the marking composition is compatible with typical training clothing and safety gear materials, being non-staining and easily washable therefrom. In specific embodiments, the marking composition is cold-water washable from such materials, optionally with brushing, and not requiring a soap, detergent, or external surfactant to substantially remove the composition from the material. Examples of specific materials for lens and fabric for compatibility are exemplified by eye/head protector lens models FX 9002 and FX 9003 (Simunition®), available commercially from General Dynamics-OTS Canada.

In specific embodiments, the marking composition is substantially free from wax (beeswax, white wax, paraffin wax, soy microcrystalline wax, etc.). In these or other embodiments, the marking composition is substantially free from emulsifying agents (e.g. mono- and diglycerides, alkoxylated mono- and diglycerides, etc.). In these or other embodiments, the marking composition is substantially free from non-hydrosoluble polymers. In these or other embodiments, the marking composition is substantially free from biological tagging agents, e.g. biological material (DNA, RNA, etc.) used for biological tagging, and/or luminescing materials (e.g. photoluminescent compounds). In these or other embodiments, the marking composition is substantially free from non-Newtonian fluids and/or non-Newtonian fluidizing compounds, as the marking composition is shear-thinning as described above. In these or other embodiments, the marking composition is substantially free from starch (e.g. corn starch, rice starch, potato starch, modified starch, etc.) and/or cellulosic polymers. In these or other embodiments, the marking composition is substantially free from oil (e.g. soy oil, castor oil, etc.), e.g. where the carrier is not an oil and the marking composition does not comprise an oil. Such oils which the marking composition is substantially free from, alternatively is free from, in these embodiments include canola oil, rapeseed oil, corn oil, cottonseed oil, olive oil, peanut oil, safflower oil, sesame oil, soybean oil, sunflower oil, in natural, metathesized, and/or hydrogenated forms.

As introduced above, the marking composition is shear-thinning. In further description of this characteristic, viscosity profiles are set forth below. Unless otherwise indicated, all values are provided with reference to viscosity (e.g. dynamic viscosity) determination at 25° C.

In order to spin-stabilize the projectile, the marking composition typically exhibits a viscosity greater than about 560 Pa·s at a shear rate less than about 2 Hz, alternatively less than about 3 Hz (i.e., at low-shear). In order to provide a proper dispersal of the marking composition upon the target upon impact, the marking composition typically also exhibits a viscosity of less than about 30 Pa·s at a shear rate of about 50 Hz, alternatively at shear rates greater than about 50 Hz. (i.e., at high-shear).

For example, with further regard to relatively high shear conditions, the marking composition typically exhibits a viscosity of about 30 Pa·s or less at a shear rate of at least about 15 Hz, alternatively at least about 20 Hz, alternatively at least about 25 Hz, alternatively at least about 30 Hz, alternatively at least about 35 Hz, alternatively at least about 40 Hz, alternatively at least about 45 Hz. In some embodiments, the marking composition has a viscosity of less than about 25 Pa·s at a shear rate of at least about 20 Hz, alternatively at least about 25, alternatively at least about 30 Hz, alternatively at least about 35 Hz, alternatively at least about 40 Hz, alternatively at least about 45 Hz, alternatively at least about 50 Hz. In specific embodiments, the marking composition has a viscosity of about 20 Pa·s or less at shear rates greater than about 80 Hz.

With regard to relatively low shear conditions, at a shear rate of about of about 3 Hz or less, alternatively of about 2 Hz or less, the marking composition typically exhibits a viscosity of at least about 500 Pa·s, such as at least about 550 Pa·s, alternatively at least about 600 Pa·s, alternatively at least about 650 Pa·s, alternatively at least about 700 Pa·s, alternatively at least about 750 Pa·s, alternatively at least about 800 Pa·s, alternatively at least about 850 Pa·s, alternatively at least about 900 Pa·s, alternatively at least about 950 Pa·s, alternatively at least about 1000 Pa·s. It is to be understood that the marking composition may exhibit a low-shear viscosity outside of these ranges as well.

In specific embodiments, the marking composition exhibits a viscosity of from greater than about 500 Pa·s to about 10M Pa·s at shear rates less than about 1 Hz. In these or other embodiments, the marking composition exhibits a viscosity of from greater than about 500 Pa·s to about 8M Pa·s at shear rates less than about 2 Hz. In these or yet other embodiments, the marking composition exhibits a viscosity of from greater than about 500 Pa·s to about 5M Pa·s at shear rates less than about 3 Hz. alternatively less than about 1 Hz. In some of these same embodiments, the marking composition also exhibits a viscosity of less than about 30 Pa·s at shear rates greater than about 15 Hz, such as at least about 20 Hz, alternatively at least about 25 Hz, alternatively at least about 30 Hz, alternatively at least about 35 Hz, alternatively at least about 40 Hz, alternatively at least about 45 Hz, alternatively at least about 50 Hz.

Typically, the marking composition has a spin-stabilizing viscosity that is greater than an impact dispersing viscosity, such that the impact dispersing viscosity of the marking composition decreases with the rate of shear at impact with a target, where the impact dispersing viscosity of the marking composition at about 25° C. is less than about 30 Pa·s (e.g. at shear rates greater than about 20 Hz), and the spin-stabilizing viscosity of the marking composition at about 25° C. is greater than about 130 Pa·s (e.g. at shear rates less than about 3 Hz).

The marking composition has a large operating temperature range, and may be used in both low-temperature and high-temperature conditions, e.g. in the marking projectile. For example, in typical embodiments, the marking composition exhibits a viscosity of from about 2 to about 1000 Pa·s throughout a temperature range of from about −15° C. to about 80° C., alternatively from about −8° C. to about 65° C. (i.e., the operating temperature range). In specific embodiments, the marking composition exhibits a 3 Hz viscosity of from about 280 to about 520 Pa·s throughout a temperature range of from about −15° C. to about 80° C., alternatively of from about −8° C. to about 65° C. In these or other embodiments, the marking composition exhibits a 50 Hz viscosity of from about 3 to about 5 Pa·s throughout a temperature range of from about −15° C. to about 80° C., alternatively of from about −8° C. to about 65° C. or (iii) both (i) and (ii).

Those of skill in the art will appreciate that the ranges listed above may be presented or otherwise described in numerous ways without departing from the scope of the embodiments to which they pertain. For example, the operation temperature range may be described in terms of the % change in viscosity between two or more temperatures. In some embodiments, the marking composition exhibits a 10 Hz viscosity at 21° C. of about 100 Pa·s+/−about 60 Pa·s, i.e., from about 40 to about 160 Pa·s. In some such embodiments, the marking composition exhibits a 10 Hz viscosity at −15° C. of from about 125 to about 135 Pa·s, i.e., an increase of from about 25 to about 35% from the 21° C. values. In these or other embodiments, the marking composition further exhibits a 10 Hz viscosity at 80° C. of from about 65 to about 75 Pa·s, i.e., a decrease of from about 25 to about 35% from the 21° C. values.

Moreover, the performance of the marking composition and/or the projectile comprising the same does not deteriorate substantially over time. As such, the marking composition is generally storage-stable with good aging performance, as demonstrated by the examples further below. For example, in specific embodiments the marking composition maintains an accuracy, precision, and or marking performance after storage within at least about 75, alternatively at least about 80, alternatively at least about 90, alternatively at least about 95, alternatively at least about 98, alternatively at least about 99% of the pre-storage performance. In some such embodiments, the maintained for a storage period of at least about 1, alternatively at least about 2, alternatively at least about 3, alternatively at least about 4, alternatively at least about 5 years. In specific such embodiments, the storage stability is maintained for that period during exposure to elevated temperatures up to about 25, alternatively about 30, alternatively about 40, alternatively about 50, alternatively about 60, alternatively about 70, alternatively about 80° C. In these or other embodiments, the storage stability is maintained for the storage period during exposure to reduced temperatures down to about 20, alternatively about 15, alternatively about 10, alternatively about 5, alternatively about 0, alternatively about −5, alternatively about −8, alternatively about −10, alternatively about −15° C.

In specific embodiment, the storage stability is determined by accuracy pre-storage (T0) and after a storage period Tm, where "m" is months of storage. For example, the marking composition may be disposed into a batch of marking projectiles, which are then assembled into non-lethal cartridges as set forth above and in the examples herein. A portion of those cartridges can then be assessed for ballistic and marking performance once prepared (T0) and again after 6 months (T6), 12 months (T12), 36 months (T36), etc. In this fashion, a percent (%) of the performance score may be utilized to monitor/assess deterioration by comparing the Tm score to the baseline (T0) and/or prior Tm score(s). Alternatively, an objective baseline may be used to simply determine pass/fail over time. Such objective criteria will typically be determined on the basis of the caliber cartridge, and may be assessed under multiple conditions across the operating range (e.g. at temperatures of −8° C., 21° C., and 40° C.).

In specific embodiments, the marking composition provides for 5.56 mm caliber marking projectiles with an accuracy (T0) at 30 m (distance) of no more than 50 cm (group size) at −8° C. (temperature); an accuracy (T0) at 30 m of no more than 50 cm at 21° C.; and/or an accuracy (T0) at 30 m of no more than 50 cm at 40° C. In these or other embodiments, the marking composition provides for 5.56 mm caliber marking projectiles with an accuracy (T0) at 30 m of no more than 40 cm at −8° C.; an accuracy (T0) at 30 m of no more than 40 cm at 21° C.; and/or an accuracy (T0) at 30 m of no more than 40 cm at 40° C. In these or other embodiments, the marking composition provides for 5.56 mm caliber marking projectiles with an accuracy (T0) at 30 m of no more than 30 cm at −8° C.; an accuracy (T0) at 30 m of no more than 30 cm at 21° C.; and/or an accuracy (T0) at 30 m of no more than 30 cm at 40° C.

In some of these embodiments, the marking composition provides for 5.56 mm caliber marking projectiles with an accuracy (T12) at 30 m of no more than 50 cm at −8° C.; an accuracy (T12) at 30 m of no more than 50 cm at 21° C.; and/or an accuracy (T12) at 30 m of no more than 50 cm at 40° C. In these or other embodiments, the marking composition provides for 5.56 mm caliber marking projectiles with an accuracy (T12) at 30 m of no more than 40 cm at −8° C.; an accuracy (T12) at 30 m of no more than 40 cm at 21° C.; and/or an accuracy (T12) at 30 m of no more than 40 cm at 40° C. In these or other embodiments, the marking composition provides for 5.56 mm caliber marking projectiles with an accuracy (T12) at 30 m of no more than 30 cm at −8° C.; an accuracy (T12) at 30 m of no more than 30 cm at 21° C.; and/or an accuracy (T12) at 30 m of no more than 30 cm at 40° C.

In some of these embodiments, the marking composition provides for 5.56 mm caliber marking projectiles with an accuracy (T60) at 30 m of no more than 50 cm at −8° C. an accuracy (T60) at 30 m of no more than 50 cm at 21° C.; and/or an accuracy (T60) at 30 m of no more than 50 cm at 40° C. In these or other embodiments, the marking composition provides for 5.56 mm caliber marking projectiles with an accuracy (T60) at 30 m of no more than 40 cm at −8° C.; an accuracy (T60) at 30 m of no more than 40 cm at 21° C.; and/or an accuracy (T60) at 30 m of no more than 40 cm at 40° C. In these or other embodiments, the marking composition provides for 5.56 mm caliber marking projectiles with an accuracy (T60) at 30 m of no more than 30 cm at −8° C.; an accuracy (T60) at 30 m of no more than 30 cm at 21° C.; and/or an accuracy (T60) at 30 m of no more than 30 cm at 40° C.

In specific embodiments, the marking composition provides for 9 mm caliber marking projectiles with an accuracy (T0) at 7.6 m (distance) of no more than 20 cm (group size) at −8° C. (temperature); an accuracy (T0) at 7.6 m of no more than 20 cm at 21° C.; and/or an accuracy (T0) at 7.6 m of no more than 20 cm at 40° C. In these or other embodiments, the marking composition provides for 9 mm caliber marking projectiles with an accuracy (T0) at 7.6 m of no more than 15 cm at −8° C.; an accuracy (T0) at 7.6 m of no more than 15 cm at 21° C.; and/or an accuracy (T0) at 7.6 m of no more than 15 cm at 40° C. In these or other embodiments, the marking composition provides for 9 mm caliber marking projectiles with an accuracy (T0) at 7.6 m of no more than 10 cm at −8° C.; an accuracy (T0) at 7.6 m of no more than 10 cm at 21° C.; and/or an accuracy (T0) at 7.6 m of no more than 10 cm at 40° C.

In some of these embodiments, the marking composition provides for 9 mm caliber marking projectiles with an accuracy (T12) at 7.6 m of no more than 20 cm at −8° C.;

an accuracy (T12) at 7.6 m of no more than t 20 cm at 21° C.; and/or an accuracy (T12) at 7.6 m of no more than 20 cm at 40° C. In these or other embodiments, the marking composition provides for 9 mm caliber marking projectiles with an accuracy (T12) at 7.6 m of at least 15 cm at −8° C.; an accuracy (T12) at 7.6 m of at least 15 cm at 21° C.; and/or an accuracy (T12) at 7.6 m of at least 15 cm at 40° C. In these or other embodiments, the marking composition provides for 9 mm caliber marking projectiles with an accuracy (T12) at 7.6 m of no more than 10 cm at −8° C.; an accuracy (T12) at 7.6 m of no more than 10 cm at 21° C.; and/or an accuracy (T12) at 7.6 m of no more than 10 cm at 40° C.

In some of these embodiments, the marking composition provides for 9 mm caliber marking projectiles with an accuracy (T60) at 7.6 m of no more than 20 cm at −8° C. (temperature); an accuracy (T60) at 7.6 m of no more than 20 cm at 21° C.; and/or an accuracy (T60) at 7.6 m of no more than 20 cm at 40° C. In these or other embodiments, the marking composition provides for 9 mm caliber marking projectiles with an accuracy (T60) at 7.6 m no more than 15 cm at −8° C.; an accuracy (T60) at 7.6 m of no more than 15 cm at 21° C.; and/or an accuracy (T60) at 7.6 m of no more than 15 cm at 40° C. In these or other embodiments, the marking composition provides for 9 mm caliber marking projectiles with an accuracy (T60) at 7.6 m of no more than 10 cm at −8° C.; an accuracy (T60) at 7.6 m of no more than 10 cm at 21° C.; and/or an accuracy (T60) at 7.6 m of no more than 10 cm at 40° C.

In specific embodiments, the marking composition provides for 5.56 mm caliber marking projectiles with a marking transfer into target (T0) at 10 m (distance) of at least 8/10, alternatively at least 9/10 hits on target (marking rate) at −8° C. (temperature); a marking transfer into target (T0) at 10 m of at least 8/10, alternatively at least 9/10 hits on target at 21° C.; and/or a marking transfer into target (T0) at 10 m of at least 8/10, alternatively at least 9/10 hits on target at 40° C.

In specific embodiments, the marking composition provides for 5.56 mm caliber marking projectiles with a marking transfer into target (T12) at 10 m of at least 8/10, alternatively at least 9/10 hits on target at −8° C.; a marking transfer into target (T12) at 10 m of at least 8/10, alternatively at least 9/10 hits on target at 21° C.; and/or a marking transfer into target (T12) at 10 m of at least 8/10, alternatively at least 9/10 hits on target at 40° C.

In specific embodiments, the marking composition provides for 5.56 mm caliber marking projectiles with a marking transfer into target (T60) at 10 m of at least 8/10, alternatively at least 9/10 hits on target at −8° C.; a marking transfer into target (T60) at 10 m of at least 8/10, alternatively at least 9/10 hits on target at 21° C.; and/or a marking transfer into target (T60) at 10 m of at least 8/10, alternatively at least 9/10 hits on target at 40° C.

In specific embodiments, the marking composition provides for 9 mm caliber marking projectiles with a marking transfer into target (T0) at 7.6 m of at least 8/10, alternatively at least 9/10 hits on target at −8° C.; a marking transfer into target (T0) at 7.6 m of at least 8/10, alternatively at least 9/10 hits on target at 21° C.; and/or a marking transfer into target (T0) at 7.6 m of at least 8/10, alternatively at least 9/10 hits on target at 40° C.

In specific embodiments, the marking composition provides for 9 mm caliber marking projectiles with a marking transfer into target (T12) at 7.6 m of at least 8/10, alternatively at least 9/10 hits on target at −8° C.; a marking transfer into target (T12) at 7.6 m of at least 8/10, alternatively at least 9/10 hits on target at 21° C.; and/or a marking transfer into target (T12) at 7.6 m of at least 8/10, alternatively at least 9/10 hits on target at 40° C.

In specific embodiments, the marking composition provides for 9 mm caliber marking projectiles with a marking transfer into target (T60) at 7.6 m of at least 8/10, alternatively at least 9/10 hits on target at −8° C.; a marking transfer into target (T60) at 7.6 m of at least 8/10, alternatively at least 9/10 hits on target at 21° C.; and/or a marking transfer into target (T60) at 7.6 m of at least 8/10, alternatively at least 9/10 hits on target at 40° C.

EXAMPLES

The present disclosure is now illustrated by the following non-limiting examples. It should be noted that various changes and modifications can be applied to the following examples and processes without departing from the scope of this disclosure, which is defined in the appended claims. Therefore, it should be noted that the following example should be interpreted as illustrative only and not limiting in any sense. Unless otherwise noted, all solvents, substrates, and reagents are purchased or otherwise obtained from various commercial suppliers (e.g. Sigma-Aldrich, VWR, Alfa Aesar) and utilized as received (i.e., without further purification) or as in a form used conventionally in the art.

Particular components used throughout the various examples are set forth in Table 1 below.

TABLE 1

| Components | |
|---|---|
| Component | Description |
| Solvent 1 | Polyethylene glycol 200 |
| Solvent 2 | Polyethylene glycol 300 |
| Solvent 3 | Triethylene glycol |
| Thickener 1 | Polydimethylsiloxane functionalized silica |
| Thickener 2 | Fumed silica, after treated with polydimethylsiloxane; specific surface area (BET): 80-120 $m^2/g$; (e.g. Aerosil R202 from Evonik) |
| Thickener 3 | Hydrophobic Fumed silica, after treated with polydimethylsiloxane; specific surface area (BET) 80-140 $m^2/g$; (e.g. Aerosil R208 from Evonik) |
| Thickener 4 | High-performance PDMS-treated fumed silica (e.g. CAB-O-SIL Ultrabond 5760 from Cabot) |
| Thickener 5 | High-thickening PDMS-treated fumed silica (e.g. CAB-O-SIL Ultrabond 5780 from Cabot) |

TABLE 1-continued

| Components | |
|---|---|
| Component | Description |
| Thickener 6 | Attapulgite clay, powdered, gelling grade |
| Surfactant 1 | Mix, sodium alpha olefin (C14-C16) sulfonate and sodium xylenesulfonate, bead |
| Surfactant 2 | C14/C16 alpha olefin sulphonate, sodium salt |
| Surfactant 3 | Linear alkylbenzene sulphonate, sodium salt |
| Surfactant 4 | Sodium lauryl sulfate powder (spray dried), 93% |
| Surfactant 5 | High-HLB C9-11 linear alcohol ethoxylate; HLB: 13.9 |
| Surfactant 6 | Bio-based alcohol ethoxylate/cationic surfactants blend (e.g. Steposol DG from Stepan Chemistry) |
| Surfactant 7 | Low-HLB C9-11 linear alcohol ethoxylate |
| Surfactant 8 | Ethoxylated coco amine; HLB 12 |
| Surfactant 9 | C9-11 alcohol ethoxylate |
| Surfactant 10 | Sodium Lauryl Ether Sulfate (SLES), 70% |
| Surfactant 11 | Sodium stearate |
| Surfactant 12 | High-HLB C9-11 linear alcohol ethoxylate |
| Surfactant 13 | C11 linear alcohol ethoxylate, POE-5 |
| Surfactant 14 | Ethoxylated coco amine; POE-10 |
| Surfactant 15 | Bio-based tallow amine ethoxylate, POE-10 |
| Dye 1 | Thermoset, fluorescent, solvent-resistant pigment, red, (e.g. T-series Dye from DayGlo) |
| Dye 2 | Water-rinseable dye, red, (e.g. SensiRinse from Sensient Industrial Colors) |
| Dye 3 | Thermoset, fluorescent, solvent-resistant pigment, yellow, (e.g. T-series Dye from DayGlo) |
| Filler 1 | Barium sulfate |
| Filler 2 | Calcium carbonate |
| Filler 3 | Dry ground calcium carbonate, medium and closely sized particle distribution |
| Filler 4 | Pumice |

Analysis Procedures

Texture: Texture is assessed by visual inspection for homogeneity, with pass criteria requiring semi-a solid and uniform compound (e.g. a paste). Rejection criteria included elastic behavior; rheopecticity; too liquid/flowable (RT, cold, and/or warm); too solid (RT, cold, and/or warm); heterogenous; granular; inappropriate yield stress; and hydrophobicity.

Washability: Three types of fabrics and two types of lens materials are used in the examples below. Fabric 1 is a 65% polyester/35% cotton; Fabric 2 is a 100% cotton fabrics; and Fabric 3 is a 60% cotton/40% polyester twill. Lens 1 is an eye/head protector lens, model FX 9002 (Simunition®), available commercially from General Dynamics-OTS Canada; and Lens 2 is an eye/head protector lens model FX 9003 (Simunition®), available commercially from General Dynamics-OTS Canada. Washability is assessed by firing projectiles onto Test Material under test at various distances, letting the marks rest for at least 2 hours, and subsequently washing the marked material in lukewarm water, without detergent, by scrubbing with a brush (fabric) or wiping with a cloth (lenses), and inspecting the washed material for visible residue.

An alternate washability procedure includes using a template (small rectangle of about 2 inches by 1 inch) and brushing about 50 g of the example making composition on a piece of the fabric using a spatula. The marking compound is let for 2 h and then washed as described above.

Using dye of the examples below, it was possible to confirm the washability even more severely using a 254 nm ultraviolet (UV) lamp to reveal traces of the marking composition otherwise invisible to the eye.

Stability

Stability is assessed by monitoring the phase stability of the Marking Composition. A bleeding analysis is performed according to ASTM D6184-98 2005 Standard Test Method for Oil Separation from Lubricating Grease (Conical Sieve Method), which is hereby incorporated by reference.

Marking Quality

Marking Quality is assessed by visual inspection of the target after being struck with the projectile. Specifically, mark visibility (e.g. stick to target, delivered from the projectile); mark size (size importance increases as operating temperatures decrease); and mark dripping i.e., (too thixotropic); other (e.g. color, cloudy, etc.) are evaluated.

Marking Performance and Precision

Marking performance is assessed using 9 mm FX GenI caliber and 5.56 mm FX GenI caliber at varying temperatures: −8° C., 21° C., and 40° C. Marking performance is assessed by actually measuring the percentage of marking projectile. A marking projectile delivers on the target a star or other marking of at least 3 arms out of 6 (GenI) or 2 arms out of 4 (GenII). A projectile which impacts the target in yaw is not consider a marking projectile (fail). The passing grade in marking performances is 9/10 and a combine 25/30 at the three combined conditioning temperature (−8, 21, 40° C.)

Performance Indications

Throughout various examples below, the relative performance of a given marking composition in a one of the analyses above against desired performance criteria (specifications) is indicated by symbol according to the following key:

| Symbol | Analysis Result |
|---|---|
| −− | Far out of specs |
| − | Out of specs |
| + | In specs |
| ++ | Better than specs |

Viscosity

Viscosity is determined using an Anton Parr MCR x2 Series rheometer (e.g. SmartPave 92), using PP50 plate and shear rates from 1-10 (1/s) at 25° C.

During development an ok QC measure, apparatus and protocol was used, according to ASTM D217-10 Standard Test Methods for Cone Penetration of Lubricating Grease.

General Preparation Procedure 1 (Kilogram Scale)

The Solvent, the Dye, and the Surfactant, are combined in a planetary mixer and mixed for 5 minutes. With stirring at a low rate, half the total amount of the Thickener is added to the mix and mixed for 15 minutes, with manual homogenizing every 5 minutes. While stirring at low rate, the remaining Thickener is added to the mix and mixed for 15 minutes, with manual homogenizing every 5 minutes.

During addition of the thickener, the mixture is periodically stirred manually (homogenized) to even it out and allow the portions of the mixture stuck in certain cavities of the mixer to return to the composition.

Preparation Example: Kilogram Scale

Solvent, Dye and Surfactant are first added in that order to a planetary mixer and the mixture is stirred moderately for 5 minutes. Half of the Thickener is then added, keeping the agitation low. The stirring is then increased, and after 15 minutes, the rest of the Thickener is added, stirring at low intensity. A final stirring step for 15 minutes results in the marking composition (e.g. see Example 4A below).

General Preparation Procedure 2 (Gram Scale)

Solvent, the Dye, the Surfactant and 20% of the Thickener is added to a planetary mixer (Thinky) container and stirred at 2000 rpm for 30 seconds. 20% of the Thickener is then added to the mix, follow by a 2000 rpm stirring period for 30 seconds. This step is repeat until all the Thickener has been added to the mix. Then, a last stirring period of 90 seconds at 2000 rpm is used to complete the marking composition.

General Preparation Procedure 3 (Large Scale)

Step 1: Add in the double planetary mixer (700-L) the Solvent (PEG200; 375 kg), the Surfactant (BioTerge AS90 beads; 51.5 kg) and the Dye (T-13 Rocket Red; 12.5 kg).

Step 2: Stir at 6-18 RPM for 45 to 60 minutes to get a homogenous mixture.

Step 3: At low intensity (3-6 RPM), add half the Thickener (silica CAB-O-SIL TS720; 30.5 kg) to the mix.

Step 4: Stir at 6-18 RPM for 45 to 60 minutes to completely mix the thickening agent.

Step 5: At low intensity (3-6 RPM), add the remaining Thickener (30.5 kg) to the mix.

Step 6: Stir at 6-18 RPM for 45 to 60 minutes to completely mix the thickening agent.

Step 7: Using a pump, transfer the completed marking compound into storage/transfer buckets.

Examples 1A-1F

Various marking compositions were prepared and analyzed according to the general procedure above, with varying amounts of the components utilized. The specific parameters and results of particular marking compositions prepared, given as Composition Examples 1A-1F, are shown in Table 2A below.

TABLE 2A

| Parameters and Performance of Composition Examples 1A-1F | | | | | | |
|---|---|---|---|---|---|---|
| Example: | 1A | 1B | 1C | 1D | 1E | 1F |
| Solvent 1 | 62.5 | 68.6 | 72 | 73.7 | 75.3 | 80.3 |
| Thickener 1 | 14.9 | 18.8 | 14.8 | 12.8 | 14 | 11.1 |
| Surfactant 1 | 20.3 | 10.1 | 10.5 | 10.8 | 8.6 | 6.8 |
| Dye 1 | 2.2 | 2.4 | 2.6 | 2.6 | 2.1 | 1.7 |
| P/S Ratio | 4.19 | 3.65 | 4.86 | 5.76 | 5.38 | 7.23 |
| Texture | + | + | + | + | + | + |
| Stability | + | + | + | + | + | + |
| Washability | + | + | + | + | + | + |
| Marking Quality | + | + | + | + | + | + |
| Marking Performance, 9 mm @ −8° C. | + | − | + | + | + | + |
| Marking Performance, 9 mm @ 21° C. | + | + | + | + | + | + |
| Marking Performance, 9 mm @ 40° C. | + | + | + | + | + | − |
| Precision, 9 mm @ −8° C. | + | + | − | + | − | + |
| Precision, 9 mm @ 21° C. | + | + | + | + | + | + |

As shown the solvent, thickener, and surfactant, were varied in amounts. All marking compositions of Composition Examples 1A-1F are washable in cold water without detergent. It can be seen that these marking compositions maintain good marking properties and precision results at all conditioning temperatures.

The stability results in Table 2A were obtained via analysis of samples via cone bleed and penetrometer. The results of these analyses indicate that the viscosity of the marking composition varies from sample to sample mainly depending on the ratio solvent (%)/thickener (%), shortened by the abbreviation P/S in this ratio. More specifically, the higher the P/S value, the more fluid behavior is exhibited by the marking composition, while conversely a low P/S value prepares a more viscous formulation. For example, Composition Example 1B comprising the highest proportion of thicker resulted in a highly viscous marking composition, which was believed to have relatively low cold-temperature fluidity and thus a reduced marking quality at −8° C. Composition Example 1D, which contains 12.8% thickener, performs effectively at all temperatures in marking and accuracy.

Temperature Dependent Precision Results

The precision of marking compositions prepared in Example 1, including those of Example 1A-1F, was assessed in marking projectiles in 9 mm cartridges in view of the P/S ratio of each marking composition. The results of the assessment are set forth in Table 2B below, where precision is reported as the maximum distance (in cm) between two impacts.

TABLE 2B

| Temperature Dependent Precision Results From Example 1 | | |
|---|---|---|
| P/S Ratio | Temperature (° C.) | Precision (cm) |
| 5.38 | −8 | 17 |
| | 21 | 9 |
| | 40 | 9 |
| 7.23 | −8 | 11 |
| | 21 | 8 |
| | 40 | 7 |
| 5.76 | −8 | 15 |
| | 21 | 9 |
| | 40 | 8 |

TABLE 2B-continued

| Temperature Dependent Precision Results From Example 1 | | |
|---|---|---|
| P/S Ratio | Temperature (° C.) | Precision (cm) |
| 4.86 | −8 | 21 |
| | 21 | 10 |
| | 40 | 8 |
| 3.65 | −8 | 11 |
| | 21 | 14 |
| | 40 | 9 |
| 4.19 | −8 | 15 |
| | 21 | 11 |
| | 40 | 8 |
| 4.19 | −8 | 16 |
| | 21 | 10 |
| | 40 | 9 |
| 4.18 | −8 | 18 |
| | 21 | 14 |
| | 40 | 11 |
| 4.19 | −8 | 18 |
| | 21 | 12 |
| | 40 | 9 |

As shown, while individual results for the marking compositions in Example 1, two zones provided consistent performance across all conditioning temperatures, the first being from P/S values of about 4.00 to about 4.20, and the second from about 5.76 to about 6.25. It is noted that the viscosity of the marking composition to be used is limited by marking performance during ballistic firing. For example, a marking composition that is too viscous leads to labeling defects at −8° C. Conversely, a very fluid formulation generates yaws at 40° C. and does not meet the performance requirement for high-temperature marking. It is also noted that accuracy at −8° C. is limited over a wide range of P/S ratios located between the problematic viscosities in labeling.

A plot of accuracy performance at −8° C. (9 mm) is shown in FIG. 8, illustrating an inverse U-shaped curve in the data at that temperature across the P/S ratios tested. Overall, a trend in performance indicates that cold temperature accuracy performance is optimal when the formulation remains below a certain viscosity (e.g. P/S≈4.20) or remains above another (P/S≈5.76). Between these two viscosity values, the accuracy results typically fall below the acceptable performance requirements. Best results were observed with P/S values between approximately 3.65 and 4.20 and between approximately 5.76 and 6.25.

Overall, across the analyses, while individual results for the marking compositions illustrated by the examples in Table 2, two zones provided consistent performance across all conditioning temperatures, the first being from P/S values of about 4.00 to about 4.20, and the second from about 5.76 to about 6.25.

Examples 2A-2L

Various marking compositions were prepared and analyzed according to the general procedure above, with varying types and amounts of the components utilized. The specific parameters and results of Examples 2A-2L are shown in Tables 3-4 below.

TABLE 3

| Parameters and Performance of Examples 2A-2F | | | | | | |
|---|---|---|---|---|---|---|
| Example: | 2A | 2B | 2C | 2D | 2E | 2F |
| Solvent 1 | 78.4 | 74.2 | 66.4 | 74.3 | 70.3 | 66.4 |
| Thickener 1 | 18.7 | 17.7 | 15.9 | 17.7 | 16.8 | 15.9 |
| Surfactant 1 | 0 | 5.3 | 15.3 | 0 | 0 | 0 |
| Surfactant 2 | 0 | 0 | 0 | 5.3 | 10.3 | 15.3 |
| Surfactant 3 | 0 | 0 | 0 | 0 | 0 | 0 |
| Surfactant 4 | 0 | 0 | 0 | 0 | 0 | 0 |
| Dye 1 | 2.8 | 2.6 | 2.4 | 2.6 | 2.5 | 2.4 |
| Texture | + | + | + | + | + | + |
| Stability | + | + | + | + | + | + |
| Washability | − | + | + | + | + | + |
| Marking Quality | + | + | − | + | + | + |
| Marking Performance, 9 mm @ −8° C. | + | + | + | + | + | + |
| Marking Performance, 9 mm @ 21° C. | + | + | + | + | + | + |
| Marking Performance, 9 mm @ 40° C. | + | + | + | + | + | + |
| Precision, 9 mm @ −8° C. | + | + | + | N/A | N/A | N/A |
| Precision, 9 mm @ 21° C. | + | + | + | + | + | + |

TABLE 4

| Parameters and Performance of Examples 2G-2L | | | | | | |
|---|---|---|---|---|---|---|
| Example: | 2G | 2H | 2I | 2J | 2K | 2L |
| Solvent 1 | 74.3 | 70.3 | 66.4 | 76.5 | 74.5 | 72.5 |
| Thickener 1 | 17.7 | 16.8 | 15.9 | 18.3 | 17.8 | 17.3 |
| Surfactant 1 | 0 | 0 | 0 | 0 | 0 | 0 |
| Surfactant 2 | 0 | 0 | 0 | 0 | 0 | 0 |
| Surfactant 3 | 5.3 | 10.3 | 15.3 | 0 | 0 | 0 |
| Surfactant 4 | 0 | 0 | 0 | 2.5 | 5 | 7.5 |
| Dye 1 | 2.6 | 2.5 | 2.4 | 2.8 | 2.7 | 2.6 |
| Texture | + | + | + | + | + | + |
| Stability | + | + | + | + | + | + |
| Washability | + | + | + | + | + | + |
| Marking Quality | + | + | + | + | + | + |
| Marking Performance, 9 mm @ −8° C. | + | + | + | + | + | + |
| Marking Performance, 9 mm @ 21° C. | + | + | + | + | + | + |
| Marking Performance, 9 mm @ 40° C. | + | + | + | − | + | + |
| Precision, 9 mm @ −8° C. | N/A | N/A | N/A | N/A | N/A | N/A |
| Precision, 9 mm @ 21° C. | + | + | + | + | + | + |

As shown, the amount and type of surfactant were varied across the marking compositions of Examples 2A-2L. All marking compositions of Examples 2A-2L are washable in cold water without detergent. It can be seen that these marking compositions maintain good marking properties and precision results at all conditioning temperatures assessed.

Examples 3A-3L

Various marking compositions were prepared and analyzed according to the general procedure above, with varying types and amounts of the components utilized. The specific parameters and results of Examples 3A-3L are shown in Tables 5-6 below.

TABLE 5

| Parameters and Performance of Examples 3A-3F | | | | | | |
|---|---|---|---|---|---|---|
| Example: | 3A | 3B | 3C | 3D | 3E | 3F |
| Solvent 1 | 69.7 | 69.3 | 68.9 | 72.9 | 70.3 | 67.8 |
| Thickener 2 | 17.5 | 18 | 18.5 | 0 | 0 | 0 |
| Thickener 3 | 0 | 0 | 0 | 13.8 | 16.8 | 19.8 |
| Thickener 4 | 0 | 0 | 0 | 0 | 0 | 0 |
| Thickener 5 | 0 | 0 | 0 | 0 | 0 | 0 |
| Surfactant 1 | 10.2 | 10.1 | 10.1 | 10.7 | 10.3 | 9.9 |
| Dye 1 | 2.5 | 2.5 | 2.4 | 2.6 | 2.5 | 2.5 |
| Texture | + | + | + | + | + | + |
| Stability | + | + | + | + | + | + |
| Washability | + | + | + | + | + | + |
| Marking Quality | + | + | + | + | + | + |
| Marking Performance, 9 mm @ −8° C. | + | + | + | + | + | + |
| Marking Performance, 9 mm @ 21° C. | + | + | + | + | + | + |
| Marking Performance, 9 mm @ 40° C. | + | + | + | + | + | + |
| Precision, 9 mm @ 21° C. | + | + | + | + | + | + |

TABLE 6

| Parameters and Performance of Examples 3G-3L | | | | | | |
|---|---|---|---|---|---|---|
| Example: | 3G | 3H | 3I | 3J | 3K | 3L |
| Solvent 1 | 72.9 | 70.3 | 67.8 | 72.9 | 70.3 | 67.8 |
| Thickener 2 | 0 | 0 | 0 | 0 | 0 | 0 |
| Thickener 3 | 0 | 0 | 0 | 0 | 0 | 0 |
| Thickener 4 | 13.8 | 16.8 | 19.8 | 0 | 0 | 0 |
| Thickener 5 | 0 | 0 | 0 | 13.8 | 16.8 | 19.8 |
| Surfactant 1 | 10.7 | 10.3 | 9.9 | 10.7 | 10.3 | 9.9 |
| Dye 1 | 2.6 | 2.5 | 2.5 | 2.6 | 2.5 | 2.5 |
| Texture | + | + | – – | + | + | – – |
| Stability | + | + | + | + | + | + |
| Washability | + | + | + | + | + | |
| Marking Quality | + | + | N/A | + | + | N/A |
| Marking Performance, 9 mm @ −8° C. | + | + | N/A | + | + | N/A |
| Marking Performance, 9 mm @ 21° C. | + | + | N/A | + | + | N/A |
| Marking Performance, 9 mm @ 40° C. | + | + | N/A | + | + | N/A |
| Precision, 9 mm @ 21° C. | + | + | N/A | + | + | N/A |

As shown, the amount and type of thickener were varied across the marking compositions of Examples 3A-3L. While stability was maintained across the thickeners assessed, specific performance of each marking compositions varied.

Comparative Examples 1-22

Various comparative marking compositions were prepared and analyzed according to the general procedure above, with varying types and amounts of the components utilized. The specific parameters and initial property observations of Comparative Examples 1-22 are shown in Tables 7-8 below.

TABLE 7

| Parameters and Properties of Comparative Examples 1-11 | | | | | | | | | | | |
|---|---|---|---|---|---|---|---|---|---|---|---|
| | Comparative Example: | | | | | | | | | | |
| | 1 | 2 | 3 | 4 | 5 | 6 | 7 | 8 | 9 | 10 | 11 |
| Solvent 1 | 0 | 0 | 0 | 0 | 0 | 0 | 0 | 42 | 42 | 42 | 42 |
| Solvent 2 | 0 | 0 | 0 | 0 | 0 | 0 | 0 | 0 | 0 | 0 | 0 |
| Solvent 3 | 11.04 | 35.23 | 24.88 | 45.1 | 47.87 | 25.99 | 24.2 | 0 | 0 | 0 | 0 |
| Thickener 6 | 4.5 | 10.92 | 10.32 | 14.3 | 13.64 | 13.81 | 12.63 | 9 | 9 | 9 | 9 |
| Surfactant 5 | 0 | 0 | 0 | 0 | 0 | 0 | 0 | 0 | 0 | 0 | 0 |
| Surfactant 6 | 0 | 0 | 0 | 0 | 0 | 0 | 0 | 0 | 0 | 0 | 3 |
| Surfactant 7 | 0 | 0 | 0 | 0 | 0 | 0 | 0 | 0 | 0 | 3 | 0 |
| Surfactant 8 | 0 | 0 | 0 | 0 | 0 | 0 | 0 | 0 | 0 | 0 | 0 |
| Surfactant 9 | 0 | 2.24 | 10.86 | 1.5 | 0 | 10.2 | 10.58 | 0 | 0 | 0 | 0 |
| Surfactant 10 | 39.52 | 0 | 0 | 0 | 0 | 0 | 0 | 0 | 0 | 0 | 0 |
| Surfactant 11 | 0 | 0 | 0 | 7.52 | 1.62 | 0 | 0 | 0 | 0 | 0 | 0 |
| Surfactant 12 | 0 | 0 | 0 | 0 | 0 | 0 | 0 | 0 | 3 | 0 | 0 |
| Surfactant 13 | 0 | 0 | 0 | 0 | 0 | 0 | 0 | 3 | 0 | 0 | 0 |
| Surfactant 14 | 0 | 0 | 0 | 0 | 0 | 0 | 0 | 0 | 0 | 0 | 0 |
| Surfactant 15 | 0 | 0 | 0 | 0 | 0 | 0 | 0 | 0 | 0 | 0 | 0 |
| Filler 1 | 44.84 | 48.55 | 50.81 | 0 | 0 | 47.07 | 49.47 | 0 | 0 | 0 | 0 |
| Filler 2 | 0 | 0 | 0 | 0 | 0 | 0 | 0 | 21 | 21 | 21 | 21 |
| Filler 3 | 0 | 0 | 0 | 30.08 | 31.82 | 0 | 0 | 0 | 0 | 0 | 0 |
| Filler 4 | 0 | 0 | 0 | 0 | 0 | 0 | 0 | 20 | 20 | 20 | 20 |
| Dye 1 | 0 | 3.06 | 3.13 | 0 | 5.05 | 2.93 | 3.12 | 5 | 5 | 5 | 5 |
| Dye 2 | 0.11 | 0 | 0 | 0 | 0 | 0 | 0 | 0 | 0 | 0 | 0 |
| Dye 3 | 0 | 0 | 0 | 1.5 | 0 | 0 | 0 | 0 | 0 | 0 | 0 |
| Texture | – | + | + | – – | – – | – – | – – | – – | – – | – – | – – |
| Stability | – – | – – | – – | + | – | N/A | N/A | N/A | N/A | N/A | N/A |
| Washability | – | – | – | + | – | N/A | N/A | N/A | N/A | N/A | N/A |

TABLE 8

| Parameters and Properties of Comparative Examples 12-22 | | | | | | | | | | | |
|---|---|---|---|---|---|---|---|---|---|---|---|
| | Comparative Example: | | | | | | | | | | |
| | 12 | 13 | 14 | 15 | 16 | 17 | 18 | 19 | 20 | 21 | 22 |
| Solvent 1 | 42 | 0 | 0 | 0 | 0 | 43 | 0 | 0 | 38.5 | 0 | 0 |
| Solvent 2 | 0 | 35 | 35 | 24 | 32 | 0 | 34 | 22 | 0 | 33.5 | 32.5 |
| Solvent 3 | 0 | 0 | 0 | 0 | 0 | 0 | 0 | 0 | 0 | 0 | 0 |
| Thickener 6 | 9 | 16 | 15 | 15 | 14 | 16 | 14 | 16 | 13 | 13 | 14 |
| Surfactant 5 | 3 | 0 | 0 | 0 | 0 | 0 | 0 | 0 | 0 | 0 | 0 |
| Surfactant 6 | 0 | 0 | 0 | 0 | 0 | 0 | 0 | 0 | 0 | 0 | 0 |
| Surfactant 7 | 0 | 0 | 0 | 0 | 0 | 0 | 0 | 0 | 0 | 0 | 0 |
| Surfactant 8 | 0 | 0 | 0 | 0 | 0 | 5 | 0 | 0 | 10 | 15 | 15 |
| Surfactant 9 | 0 | 0 | 0 | 0 | 0 | 0 | 0 | 0 | 0 | 0 | 0 |
| Surfactant 10 | 0 | 0 | 0 | 0 | 0 | 0 | 0 | 0 | 0 | 0 | 0 |
| Surfactant 11 | 0 | 0 | 0 | 0 | 0 | 0 | 0 | 0 | 0 | 0 | 0 |
| Surfactant 12 | 0 | 0 | 0 | 0 | 0 | 0 | 0 | 0 | 0 | 0 | 0 |
| Surfactant 13 | 0 | 0 | 0 | 0 | 0 | 0 | 0 | 0 | 0 | 0 | 0 |
| Surfactant 14 | 0 | 15 | 0 | 25 | 0 | 0 | 15 | 25 | 0 | 0 | 0 |
| Surfactant 15 | 0 | 0 | 15 | 0 | 15 | 0 | 0 | 0 | 0 | 0 | 0 |
| Filler 1 | 0 | 0 | 0 | 0 | 0 | 0 | 0 | 0 | 0 | 0 | 0 |
| Filler 2 | 21 | 30 | 31 | 32 | 35 | 33 | 33 | 33 | 35 | 35 | 35 |
| Filler 3 | 0 | 0 | 0 | 0 | 0 | 0 | 0 | 0 | 0 | 0 | 0 |
| Filler 4 | 20 | 0 | 0 | 0 | 0 | 0 | 0 | 0 | 0 | 0 | 0 |
| Dye 1 | 5 | 4 | 4 | 4 | 4 | 3 | 4 | 4 | 3.5 | 3.5 | 3.5 |
| Dye 2 | 0 | 0 | 0 | 0 | 0 | 0 | 0 | 0 | 0 | 0 | 0 |
| Dye 3 | 0 | 0 | 0 | 0 | 0 | 0 | 0 | 0 | 0 | 0 | 0 |
| Texture | − − | + | + | + | + | − − | − − | − − | − − | − − | − − |
| Stability | N/A | N/A | N/A | N/A | N/A | N/A | N/A | N/A | N/A | N/A | N/A |
| Washability | N/A | N/A | N/A | N/A | N/A | N/A | N/A | N/A | N/A | N/A | N/A |

The comparative marking compositions were assessed initially by texture before assessment of stability and washability. Based on these initial properties, Comparative Examples 3 and 13-16 were selected for further assessment, and analyzed for performance. The specific performance results of Comparative Examples 3 and 13-16 are shown in Table 9 below.

TABLE 9

| Performance Results of Comparative Examples 3 and 13-16 | | | | | |
|---|---|---|---|---|---|
| Comparative Example: | 3 | 13 | 14 | 15 | 16 |
| Marking Performance, 9 mm @ −8° C. | N/A | − | + | − | + |
| Marking Performance, 9 mm @ 21° C. | N/A | − | + | + | + |
| Marking Performance, 9 mm @ 40° C. | N/A | − − | − | − − | + |
| Precision, 9 mm @ −8° C. | N/A | − − | + | − − | + |
| Precision, 9 mm @ 21° C. | N/A | + | + | − − | + |
| Precision, 9 mm @ 40° C. | N/A | − − | + | − − | + |
| Marking Performance, 5.56 mm @ −8° C. | − | − − | − − | − − | − − |
| Marking Performance, 5.56 mm @ 21° C. | − − | + | + | − | + |
| Marking Performance, 5.56 mm @ 40° C. | − − | + | + | − − | − |
| Precision, 5.56 mm @ −8° C. | N/A | − − | − − | − − | − − |
| Precision, 5.56 mm @ 21° C. | − − | + | + | + | + |
| Precision, 5.56 mm @ 40° C. | N/A | + | + | + | + |

As shown, the comparative marking compositions varied greatly in performance across the range of assessments. Of the 22 variant compositions trialed as shown, only 5 (Comparative Examples 3 and 13-16) maintained adequate formulation properties. However, even these comparative marking compositions did not exhibit the performance results obtained by the exemplary marking compositions of the prior examples.

Examples 4A-4C

Three marking compositions were prepared and analyzed according to the general procedure above, based on the highest observed performance across the compositions of the prior examples. The specific parameters and results of Examples 4A-4C are shown in Table 10 below.

Marking Compositions were prepared at scale using large-scale preparation procedure above, to prepare lots of the formulations of Example 4B (Lot 1; 200 kg) and Example 4A (Lot 2, 200 kg; Lot 4, 500 kg). Samples of each lot were assessed via rheometer, the results of which are shown in a plot in FIG. 7.

TABLE 10

| Parameters and Performance of Examples 4A-4C | | | |
|---|---|---|---|
| Example: | 4A | 4B | 4C |
| Solvent 1 | 75 | 70.3 | 68.55 |
| Thickener 1 | 12.2 | 16.8 | 16.45 |
| Surfactant 1 | 10.3 | 10.3 | 10 |
| Dye 1 | 2.5 | 2.5 | 5 |
| Texture | + | + | + |
| Stability | + | + | + |
| Washability | + | + | + |
| Marking Quality | + | + | + |
| Marking Performance, 9 mm @ −8° C. | + | + | + |
| Marking Performance, 9 mm @ 21° C. | + | + | + |
| Marking Performance, 9 mm @ 40° C. | + | + | + |
| Precision, 9 mm @ −8° C. | + | + | + |
| Precision, 9 mm @ 21° C. | + | + | + |
| Precision, 9 mm @ 40° C. | + | + | + |
| Marking Performance, 5.56 mm @ −8° C. | + | + | + |
| Marking Performance, 5.56 mm @ 21° C. | + | + | + |
| Marking Performance, 5.56 mm @ 40° C. | + | + | + |
| Precision, 5.56 mm @ −8° C. | + | + | + |
| Precision, 5.56 mm @ 21° C. | + | + | + |
| Precision, 5.56 mm @ 40° C. | + | + | + |
| Accelerated Aging, 3 weeks | + | + | + |
| Accelerated Aging, 6 weeks | + | + | + |
| Accelerated Aging, 12 weeks | + | + | + |
| Non toxic | + | + | + |
| Odorless | + | + | + |
| Lightweight (under 1.5 g/mL) | + | + | + |
| Cartridge Compatible | + | + | + |

TABLE 10-continued

| Parameters and Performance of Examples 4A-4C | | | |
|---|---|---|---|
| Example: | 4A | 4B | 4C |
| Protective Gear Compatible | + | + | + |
| Equipment Compatible | + | + | + |
| Fillable under Normal Manufacturing Cond. | + | + | + |

As shown, each of the marking compositions of Examples 4A-4C perform across the range of conditions tested. Moreover, accelerated aging used to simulate long-term storage indicates these marking compositions are stable over time, providing improvements over existing marking compositions.

For assessing the long-term stability, an accelerated aging factor (AAF) was determined from an aging factor for every 10° C. above or below ambient temperature (Q10), where a Q2 value of 2 is considered a conservative approach. The results of the aging and determinations provided an AAF value of 29.86 at 70° C. and 59.71 at 80° C. Accordingly, it is estimated that ageing for six weeks at 70° C. is equivalent to 3 years, 5 months, and 3 weeks at 21° C., while at the same period of aging at 80° C. is equivalent to 6 years, 11 months, and 2 weeks. Using the marking compositions of the Examples above, projectiles fired at after six weeks of aging at 80° C. still performed in marking and accuracy according to the criteria of the assessment. As such, it is believed that the marking compositions of these examples exhibit a room temperature stability of at least about 7 years.

While not shown, six additional conditioning temperatures were analyzed outside of the other conditions provided for above to further assess the flight characteristics observed at low or high temperatures. These temperatures (−25° C., −20° C., −15° C., 55° C., 60° C., and 65° C.) were assessed in 9 mm caliber, because it is the projectile with the most difficult performance requirements to achieve.

In general, there is a loss of marking efficiency at −20° C. and −25° C. which prevents results from being obtained during precision tests. The cartridge series packaged at −15° C. performed well in marking, however the results were inconclusive in accuracy and this series exceeded the formulation requirement by 5 cm in 9 mm tests. The three series that were subjected to a temperature greater than or equal to 55° C. performed well in both marking and accuracy.

In order to ensure that these data are consistent over time, a 12-week ageing at 40° C. was carried out on two sets of cartridges. The two series were conditioned at −15° C. and 65° C. respectively, and then analyzed for marking and precision once again. After storage, the projectiles and the formulation they contain appear identical. No movement of the marker in the projectile cavity was found among the thousands of cartridges assembled and subjected to accelerated aging.

Overall, the results demonstrate that the marking compositions herein are relatively insensitive to thermal shocks (e.g. from −8° C. to 40° C.) and provide for storability at varying projectile or bulk temperatures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims. Moreover, all combinations of the aforementioned components, compositions, method steps, formulation steps, etc. are hereby expressly contemplated for use herein in various non-limiting embodiments even if such combinations are not expressly described in the same or similar paragraphs.

With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the ranges and subranges enumerated herein sufficiently describe and enable various embodiments of the present invention, and such ranges and subranges may be further delineated into relevant halves, thirds, quarters, fifths, and so on. As just one example, a range “of from 0.1 to 0.9” may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as “at least,” “greater than,” “less than,” “no more than,” and the like, it is to be understood that such language includes subranges and/or an upper or lower limit. As another example, a range of “at least 10” inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. An individual number within a disclosed range may be relied upon and provides adequate support for specific embodiments within the scope of the appended claims. For example, a range “of from 1 to 9” includes various individual integers, such as 3, as well as individual numbers including a decimal point (or fraction), such as 4.1, which may be relied upon and provide adequate support for specific embodiments within the scope of the appended claims. Lastly, it will be understood that the term “about” with regard to any of the particular numbers and ranges described herein is used to designate values within standard error, equivalent function, efficacy, final loading, etc., as understood by those of skill in the art with relevant conventional techniques and processes for formulation and/or utilizing compounds and compositions such as those described herein. As such, the term “about” may designate a value within 10, alternatively within 5, alternatively within 1, alternatively within 0.5, alternatively within 0.1, % of the enumerated value or range.

While the present disclosure has been described with respect to particular embodiments thereof, it is apparent that numerous other forms and modifications will be obvious to those skilled in the art. The appended claims and this disclosure generally should be construed to cover all such obvious forms and modifications, which are within the true scope of the present disclosure.

What is claimed is:

1. A marking projectile comprising:

a frangible polymeric shell comprising a cylindrical portion and having an interior cavity, wherein the frangible shell is configured to engage rifling in a barrel so that the marking projectile spins when fired through the barrel; and a marking composition within the interior cavity, the marking composition being a non-aqueous shear-thinning fluid and comprising:

an organic solvent, a thickener, a surfactant, and optionally, a colorant.

2. The marking projectile of claim 1, wherein: (i) the organic solvent of the marking composition comprises a polyethylene glycol having a weight average molecular weight (MW) of from about 150 to about 600, alternatively of from about 200 to about 300; (ii) the organic solvent is present in the marking composition in an amount of from about 55 to about 85 wt. %, based on the total weight of the marking composition; or (iii) both (i) and (ii).

3. The marking projectile of claim 2, wherein the marking composition comprises from about 60 to about 80 wt. %, alternatively from about 65 to about 80 wt. % of the organic solvent, and wherein the organic solvent consists essentially of polyethylene glycol 200.

4. The marking projectile of claim 1, wherein: (i) the thickener of the marking composition comprises a fumed silica; (ii) the thickener is present in the marking composition in an amount of from about 10 to about 19 wt. %, based on the total weight of the marking composition; or (iii) both (i) and (ii).

5. The marking projectile of claim 4, wherein the marking composition comprises from about 12 to about 17 wt. % of the thickener, and wherein the thickener consists essentially of a polydimethylsiloxane-functionalized fumed silica.

6. The marking projectile of claim 1, wherein the marking composition comprises the organic solvent and the thickener in a wt./wt. ratio of from about 3.5 to about 4.5 or from about 5.6 to about 6.3, alternatively from about 4 to about 4.2 or from about 5.76 to about 6.25.

7. The marking projectile of claim 1, wherein: (i) the surfactant of the marking composition comprises at least one anionic surfactant; (ii) the surfactant is present in the marking composition in an amount of from about 5 to about 15 wt. %, based on the total weight of the marking composition; or (iii) both (i) and (ii).

8. The marking projectile of claim 7, wherein the marking composition comprises from about 8 to about 12 wt. % of the surfactant, and wherein the surfactant comprises at least one organic sodium sulfonate.

9. The marking projectile of claim 1, wherein the surfactant: (i) comprises sodium C14-C16 alpha olefin sulfonate, sodium xylenesulfonate, or combinations thereof; (ii) is utilized in the marking composition in the form of a spray-dried powder or bead; or (iii) both (i) and (ii).

10. The marking projectile of claim 1, wherein marking composition comprises the colorant, and wherein the colorant is present in an amount of from about 1 to about 10, alternatively from about 2 to about 6 wt. %, based on the total weight of the marking composition.

11. The marking projectile of claim 10, wherein the colorant is further defined as a dye, and where the dye comprises a thermoset, fluorescent pigment.

12. The marking projectile of claim 1, wherein the marking composition comprises:

from about 70 to about 80 wt. % of polyethylene glycol 200;

from about 10 to about 16 wt. % of a polydimethylsiloxane-functionalized fumed silica;

from about 8 to about 12 wt. % of a mixture of sodium C14-C16 alpha olefin sulfonate and sodium xylenesulfonate; and from about 2 to about 5 wt. % of a thermoset fluorescent dye, each based on the total weight of the marking composition.

13. The marking projectile of claim 1, wherein the marking composition: (i) is substantially free from water; (ii) is substantially free from volatile organic compounds (VOCs); or (iii) both (i) and (ii).

14. The marking projectile of claim 1, wherein the marking composition exhibits: (i) a 3 Hz viscosity of from about 280 to about 520 Pa's throughout a temperature range of from about −15° C. to about 80° C., alternatively of from about −8° C. to about 65° C.; (ii) a 50 Hz viscosity of from about 3 to about 5 Pa's throughout a temperature range of from about −15° C. to about 80° C., alternatively of from about −8° C. to about 65° C.; or (iii) both (i) and (ii).

15. The marking projectile of claim 1, wherein the marking composition has a spin-stabilizing viscosity that is greater than an impact dispersing viscosity, such that the impact dispersing viscosity of the marking composition decreases with the rate of shear at impact with a target, where the impact dispersing viscosity of the marking composition is less than about 30 Pa's at a shear rate of about 20 Hz or greater at about 25° C., and the spin-stabilizing viscosity of the marking composition is greater than about 500 Pa's at shear rates less than about 3 Hz at about 25° C.

16. The marking projectile of claim 1, in combination with a casing and a propelling system comprising an energetic material the projectile disposed in the mouth of the casing.

17. The marking projectile of claim 16, wherein the energetic material comprises: (i) a primer; (ii) a propellant; or (iii) both (i) and (ii).

18. The marking projectile of claim 1, further defined as a non-lethal marking projectile used in place of a cartridge having a bullet.

19. The marking projectile of claim 18, wherein the cartridge is further defined as a 5.56 mm cartridge or a 9 mm cartridge.

20. The marking projectile of claim 1, in combination with a reduced energy cartridge adapted to propel the marking projectile with gases generated only by at least one primer.

* * * * *